(12) United States Patent
Keeler et al.

(10) Patent No.: US 10,994,581 B2
(45) Date of Patent: May 4, 2021

(54) SPREAD ACTIVE CLAMP GROUP FOR VEHICLE LEAF SPRING

(71) Applicant: Hendrickson USA, L.L.C., Itasca, IL (US)

(72) Inventors: Michael J. Keeler, Naperville, IL (US); Dmitriy Enrikovich Rubalskiy, Bolingbrook, IL (US); Scott Allen Massa, Chicago, IL (US); Jeffrey R. Zawacki, Channahon, IL (US); Michael P. Bloink, Romeoville, IL (US); Damon E. Dilworth, Channahon, IL (US); Matthew J. Van Meter, Plainfield, IL (US)

(73) Assignee: HENDRICKSON USA, L.L.C., Itasca, IL (US)

( * ) Notice: Subject to any disclaimer, the term of this patent is extended or adjusted under 35 U.S.C. 154(b) by 86 days.

(21) Appl. No.: 15/751,444

(22) PCT Filed: Aug. 9, 2016

(86) PCT No.: PCT/US2016/046185
§ 371 (c)(1),
(2) Date: Feb. 8, 2018

(87) PCT Pub. No.: WO2017/027516
PCT Pub. Date: Feb. 16, 2017

(65) Prior Publication Data
US 2018/0229567 A1 Aug. 16, 2018

Related U.S. Application Data

(60) Provisional application No. 62/202,890, filed on Aug. 9, 2015.

(51) Int. Cl.
*B60G 11/46* (2006.01)
*B60G 11/113* (2006.01)
(Continued)

(52) U.S. Cl.
CPC ............ *B60G 11/465* (2013.01); *B60G 11/04* (2013.01); *B60G 11/113* (2013.01); *B60G 11/38* (2013.01);
(Continued)

(58) Field of Classification Search
CPC ..... B60G 11/465; B60G 11/113; B60G 11/38; B60G 13/005; F16F 1/3683
See application file for complete search history.

(56) References Cited

U.S. PATENT DOCUMENTS

| 3,730,550 A | 5/1973 | Thaxton |
| 4,519,590 A * | 5/1985 | Wells ................... B60G 11/113 267/149 |

(Continued)

FOREIGN PATENT DOCUMENTS

| CN | 2918127 U | 7/2007 |
| DE | 102009021840 B3 | 11/2010 |

(Continued)

*Primary Examiner* — Faye M Fleming
(74) *Attorney, Agent, or Firm* — Cook Alex Ltd.

(57) ABSTRACT

A clamp group for a vehicle leaf spring suspension is disclosed. The clamp group secures a longitudinally disposed, leaf spring at separate and distinct locations, between which the leaf spring is undamped and spaced away from the top and bottom pads of the clamp group. Shear stress is reduced and the spring remains active throughout its length.

24 Claims, 30 Drawing Sheets

(51) Int. Cl.
  *F16F 1/368* (2006.01)
  *B60G 11/38* (2006.01)
  *B60G 11/04* (2006.01)
  *B60G 13/00* (2006.01)

(52) U.S. Cl.
  CPC .......... *B60G 13/005* (2013.01); *F16F 1/3683* (2013.01); *B60G 2200/30* (2013.01); *B60G 2200/326* (2013.01); *B60G 2202/112* (2013.01); *B60G 2204/121* (2013.01); *B60G 2204/126* (2013.01); *B60G 2204/129* (2013.01); *B60G 2204/1482* (2013.01); *B60G 2204/41* (2013.01); *B60G 2204/4306* (2013.01); *B60G 2206/428* (2013.01); *B60G 2206/7101* (2013.01); *B60G 2500/30* (2013.01); *F16F 2230/0005* (2013.01)

(56) References Cited

U.S. PATENT DOCUMENTS

| | | | | |
|---|---|---|---|---|
| 4,630,804 | A | * | 12/1986 | Fesko ................... B60G 11/113 264/149 |
| 4,643,406 | A | * | 2/1987 | Mounier-Poulat .... B60G 11/113 267/148 |
| 4,646,406 | A | | 3/1987 | Weiss et al. |
| 4,684,110 | A | | 8/1987 | Sale et al. |
| 4,750,718 | A | | 6/1988 | Nickel |
| 4,801,129 | A | * | 1/1989 | Wells .................... B60G 11/113 267/158 |
| 5,328,159 | A | * | 7/1994 | Kaufman ............... B60G 11/113 267/52 |
| 7,744,105 | B2 | * | 6/2010 | Dudding ............... B60G 11/113 280/124.175 |
| 8,360,453 | B2 | | 1/2013 | Fruhmann et al. |
| 8,360,454 | B2 | | 1/2013 | Fruhmann et al. |
| 8,444,162 | B2 | | 5/2013 | Fruhmann et al. |
| 8,444,163 | B2 | | 5/2013 | Fruhmann et al. |
| 8,678,418 | B1 | | 3/2014 | Sjoesten et al. |
| 8,950,766 | B2 | | 2/2015 | Schönen et al. |
| 2008/0258361 | A1 | | 10/2008 | Wen et al. |

FOREIGN PATENT DOCUMENTS

| | | | |
|---|---|---|---|
| DE | 102009028899 A1 | 3/2011 | |
| EP | 0178286 A1 * | 4/1986 | ........... B60G 11/113 |
| EP | 0178286 B1 | 3/1989 | |
| EP | 0188133 B1 | 7/1990 | |
| EP | 2365229 A2 | 9/2011 | |

\* cited by examiner

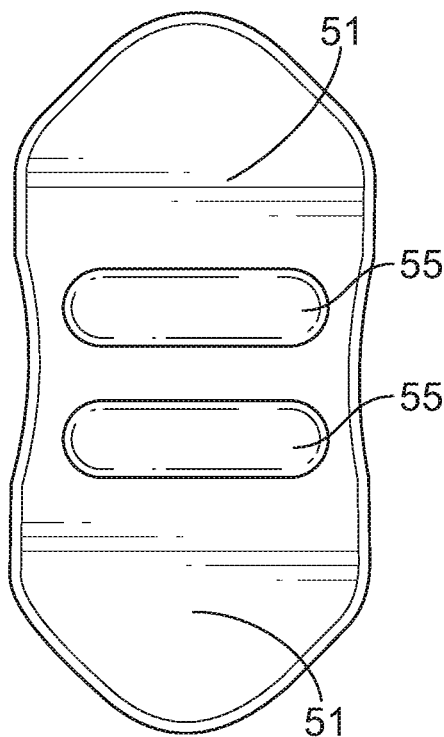
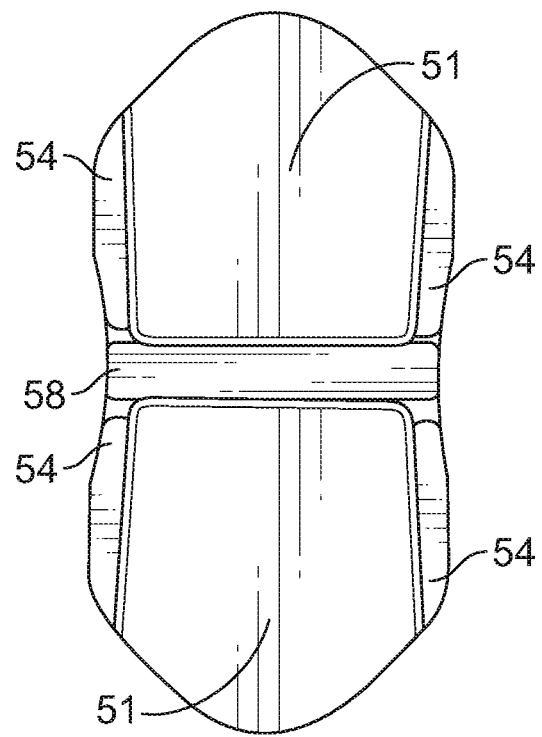
FIG. 30    FIG. 31
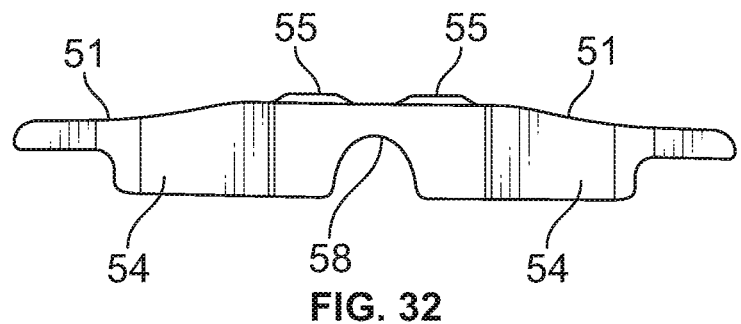
FIG. 32
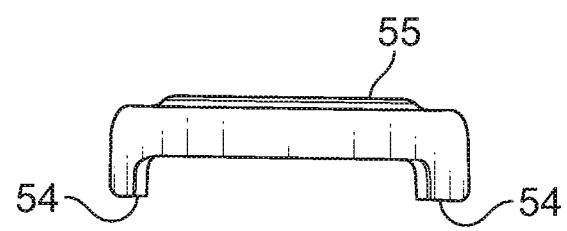
FIG. 33

SPREAD ACTIVE CLAMP GROUP FOR VEHICLE LEAF SPRING

CROSS-REFERENCE TO RELATED APPLICATIONS

This patent application is a U.S. national phase application of PCT International Application No. PCT/US2016/046185, filed Aug. 9, 2016, which claims prior to and the benefit of U.S. Provisional Application Ser. No. 62/202,890 filed Aug. 9, 2015, all of which are incorporated herein by reference in their entireties.

BACKGROUND OF THE INVENTION

Field of the Disclosure

The present subject matter relates generally to clamp groups which connect a vehicle axle to a leaf spring as part of the suspension system and more particularly to clamps groups which perform this function in a manner that allows the spring to remain active over a greater portion of its length when compared with conventional clamp group arrangements.

Leaf spring suspensions with single point clamp groups are typically not active or are only semi active. As such, some portion of the spring is clamped rigidly making it 'dead' or inactive thus reducing its effective spring length and increasing its vertical spring rate. Leaf spring suspensions that use traditional metal leaf springs have made strides to reduce weight, but more weight reduction is desired for numerous reasons, including but not limited to payload capacity and fuel efficiency.

Composite leaf springs have been used to further reduce weight. However, composite leaf springs have a tendency to experience interlaminar shear failure in heavy duty applications, such as may occur under increased or excessive vertical loading or during axle wind-up, the latter of which becomes a particular challenge as new laws and regulations require shorter stopping distances for heavy duty and commercial vehicles.

Increasing the thickness of a leaf spring will reduce shear stress, however, such will also increase vertical spring rate. In a composite spring, this adjustment results in a spring that it too stiff, particularly for use in connection with a front steering axle. A leaf spring for a front steering axle preferably has a lower spring rate to provide acceptable ride quality but also to withstand significant stresses when load is transferred to the front of the vehicle during braking.

The present disclosure addresses shortcomings found in prior art suspension systems.

SUMMARY OF THE INVENTION

There are several aspects of the present subject matter which may be embodied separately or together in the devices and systems described and claimed herein. These aspects may be employed alone or in combination with other aspects of the subject matter, and the description of these aspects together is not intended to preclude the use of these aspects separately or the claiming of such aspects separately as set forth in the claims appended hereto.

In one aspect of this disclosure, a suspension system for a vehicle axle is disclosed that includes a leaf spring extending in parallel with the longitudinal axis of a vehicle. The leaf spring has first and second seat portions that are separated from one another along the longitudinal axis of the leaf spring. Also included is a clamp assembly that includes first and second clamp groups associated with respectively the first and second seat portions of the leaf spring. Each of the first and second clamp groups further include a fastener assembly, a top mounting pad and a bottom mounting pad that oppose, and are in vertical alignment with one another, on opposite sides of the leaf spring. Top and bottom elastomeric pads are positioned between, respectively, the top and bottom mounting pads of the leaf spring. The bottom mounting pads or the top mounting pads are part of axle seat bracket configured to receive a laterally disposed vehicle axle. When the fastener assembly is tightened, the associated top mounting pad, top elastomeric pad, leaf spring, bottom elastomeric pad and bottom mounting pad are coupled together. The section of the leaf spring between the first and second clamp groups remains unclamped and exhibits positive vertical displacement without contacting any rigid component of the clamp assembly.

BRIEF DESCRIPTION OF THE DRAWINGS

In describing the preferred examples, reference is made to the accompanying drawing figures.

FIG. 30 is a top view of an elastomeric pad of the embodiment shown in FIGS. 1-14.

FIG. 31 is a bottom view of the elastomeric pad shown in FIG. 30.

FIG. 32 is a side view of the elastomeric pad shown in FIGS. 30-31 (left side and right views are the same).

FIG. 33 is an end view of the elastomeric sleeve or pad of FIGS. 30-32 (front end and rear end views are the same).

DETAILED DESCRIPTION

Figure 1:
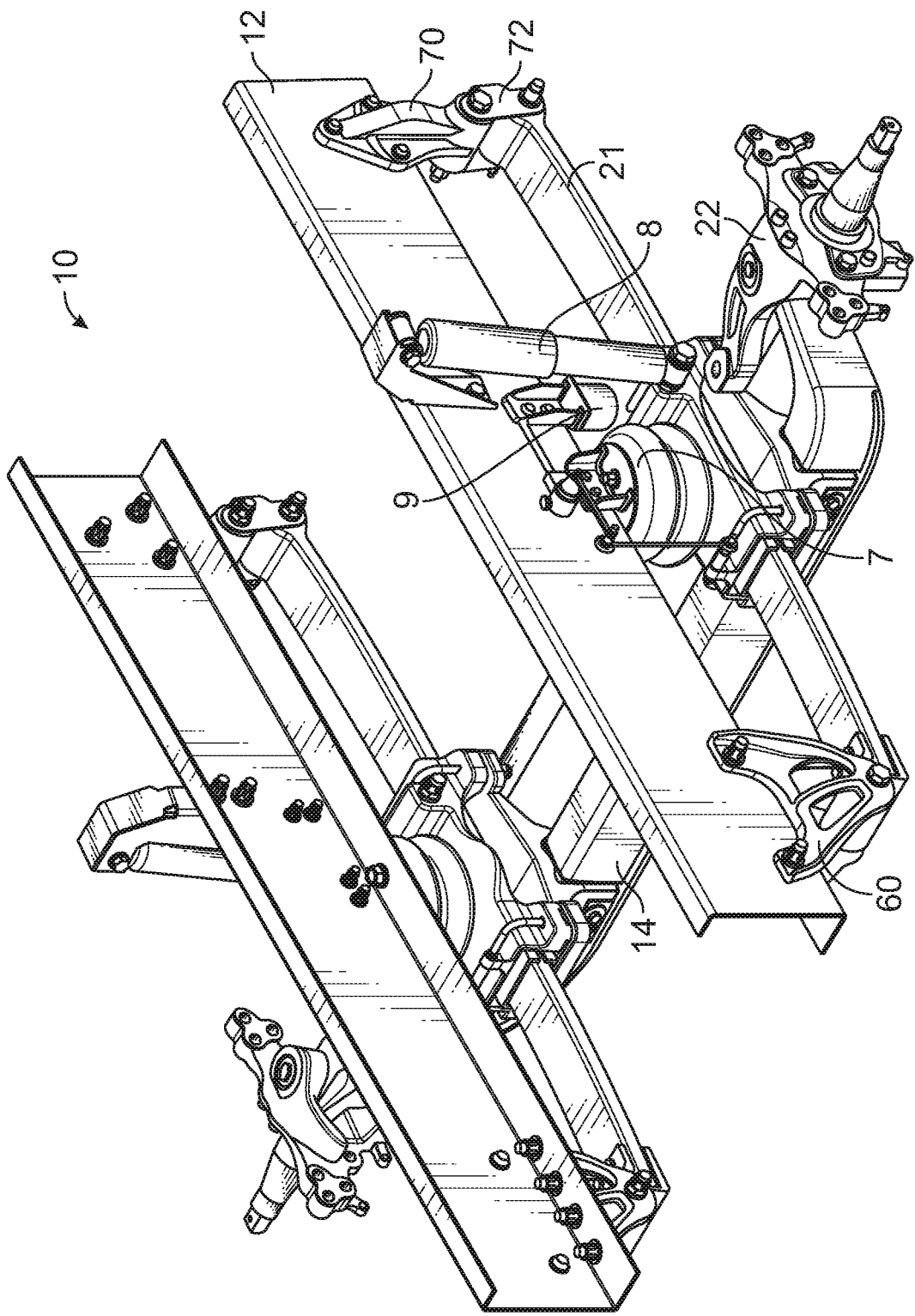
FIG. 1 is a left side, upper front perspective view of a vehicle axle suspension system mounted to the chassis of a vehicle and incorporating a clamp assembly according to a first embodiment of the present disclosure.

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Mechanical leaf springs are typically connected to a vehicle axle through the use of a rigid clamp group at or near the center of the spring. In a conventional, centralized clamp group design (FIG. A), because the clamp group is effectively rigid, the spring cannot flex in the area of the clamp group. It is, therefore, inactive or 'dead' inside the clamp group. As such, the effective length of the spring is considered to be only the portion of the spring that is not inside the clamp group.

An active clamp group has been considered in the past that would utilize an elastic material surrounding the spring and allowing it to flex and remain active within a centralized, single clamp group. (See, e.g., U.S. Pat. Nos. 7,931,287, 8,029,008 and 8,177,246, all of which in their entirety are incorporated herein by reference).

The present disclosure divides a single centralized clamp group into at least two smaller, separate and active clamp groups, spread longitudinally along the length of the leaf spring, preferably one forward of the axle and one rearward of the axle. This arrangement will make the spring act like a beam in 4-point bending rather than 3-point bending. Under 4-point bending, the portion of the leaf spring between the two clamp groups will experience constant (uniform) shear and bending stress under load.

The composite leaf spring of the illustrated embodiments is fiber wound and has a generally constant cross section along its length, making it cost effective, lightweight and easy to manufacture. However, as those skilled in the art of composite leaf springs will appreciate, a design limit for composite structural components is often shear stress as it is dependent on the resin strength which is a weak link in a composite. Shear stress is a function of the cross-sectional area of the leaf spring. To reduce shear stress, one may increase the cross sectional area by increasing the thickness and/or the width of the leaf spring, however this will have a negative impact on the overall stiffness of the leaf spring and increase its vertical spring rate. Increasing thickness too much will also reduce ride quality to an unacceptable level. An alternative approach is to reduce shear force by making a longer single clamp group assembly, however this approach will add to the cost and weight of the clamp assembly and tend to shorten the effective (also referred to as the unrestricted or active) length of the spring, making it more stiff.

The spread active clamp designs of the present disclosure represent an improvement by separating into two distinct and separate active clamp groups to reduce shear force reaction loads from braking at an acceptable weight and cost. The spread active clamp designs of the present disclosure increase the moment arm for reacting brake loads and reduce shear stress without further confining the spring. As such, they allow for reducing shear stress while maintaining vehicle ride quality and managing cost and weight targets. They also further increase the lateral stiffness of the suspension which is typically beneficial from a ride comfort and handling perspective when compared to a leaf spring suspension with a single clamp group arrangement.

In the absence of the teachings of the present disclosure and the associated reduction in shear stress, the thickness required in a composite leaf spring would have discouraged its use in a heavy duty front steering axle suspension and other demanding suspension applications. With the teachings of the present disclosure, this type of spring now becomes a viable, cost effective and competitive option for a front steering axle, a non-steering axle, and other demanding suspension applications.

The spread active clamp designs of the present disclosure also allow the leaf spring to remain active throughout its length thus eliminating any 'dead' area and allowing for shorter springs to be used.

Another benefit is that they allow for shorter springs to be used while also reducing shear stresses. Shear stress varies proportionately with the distance that the clamp group is spread. As this spread increases, shear stress decreases. Shear stress is typically the leading design limitation with composite leaf springs as it is limited to the strength of the resin system used in the composite.

Another benefit is that they allow for the reduction of bending stresses by reducing the moment arm between the clamp group and the ends of the spring.

Another benefit is that they enable the use of composite leaf springs that are low cost, lightweight, easy to manufacture and have an acceptable spring rate and the capability of handling more demanding applications, such as for example, in a heavy duty front steering axle suspension, or more generally wherever increased vertical loads and/or higher brake torques are desired or required, such as with regulations that reduce the stopping distances for heavy duty or commercial vehicles.

Another benefit is that they achieve any one or more of the foregoing objectives while reducing or minimizing the weight and volume of the suspension system in which it is employed. Although the weight of the clamp portion of a spread axle clamp assembly of the present disclosure may be slightly heavier than the corresponding structure of a comparably rated, single centralized clamp assembly, an over fifty percent reduction in weight of the enabled composite leaf spring with which the spread axle clamp is used results in the unsprung weight of a heavy duty front steering suspension system (12K weight capacity) incorporating the combination of a spread axle clamp and composite spring being reduced by 50 or more pounds over the competing single centralized clamp/metal spring alternative.

Turning to FIGS. 1-33, a first example suspension system 10 in is illustrated for coupling longitudinally extending frame members 12 of a vehicle chassis to a laterally extending axle 14 that is disposed below the frame members 12, such as for use in a heavy duty truck or other wheeled vehicle.

The leaf spring 21 of the illustrated embodiments is fiber wound and has a generally constant cross section along its length, making it cost effective, lightweight and easy to manufacture. It will be appreciated that the spread active clamp designs discussed herein are not limited to use with a composite leaf spring having a generally constant cross section, and therefore may employ other leaf spring types (i.e. metal and non-metal, including composite, parabolic and non-parabolic, varying and non-varying cross section) without departing from the scope of the present disclosure.

The leaf spring 21 of the present disclosure is connected generally in parallel with the longitudinal axis of a vehicle. In the illustrated embodiment, a first eye of the leaf spring at the front end of the spring is connected to a vehicle frame 12 via a bushing that extends through the eye and an associated first frame hanger 60. A second eye of the leaf spring located at the rear end of the spring is connected to the vehicle frame via a bushing that extends through the second eye, and an associated shackle 72 and second vehicle frame hanger 70. It will be appreciated, however, that alternative configurations for leaf spring ends and frame coupling assemblies may be desired for particular mounting arrangements.

As with the other drawings in this disclosure, it will be appreciated that the figures show a front suspension system 10 for a steering axle, but that the suspension system could be configured for use with a non-steering rear axle. Although some of the drawing figures show components of the left side of the first example suspension system 10, it will be appreciated that similar components, configured for the right side of the suspension system 10 would be provided to form a full suspension system.

Figure 2:
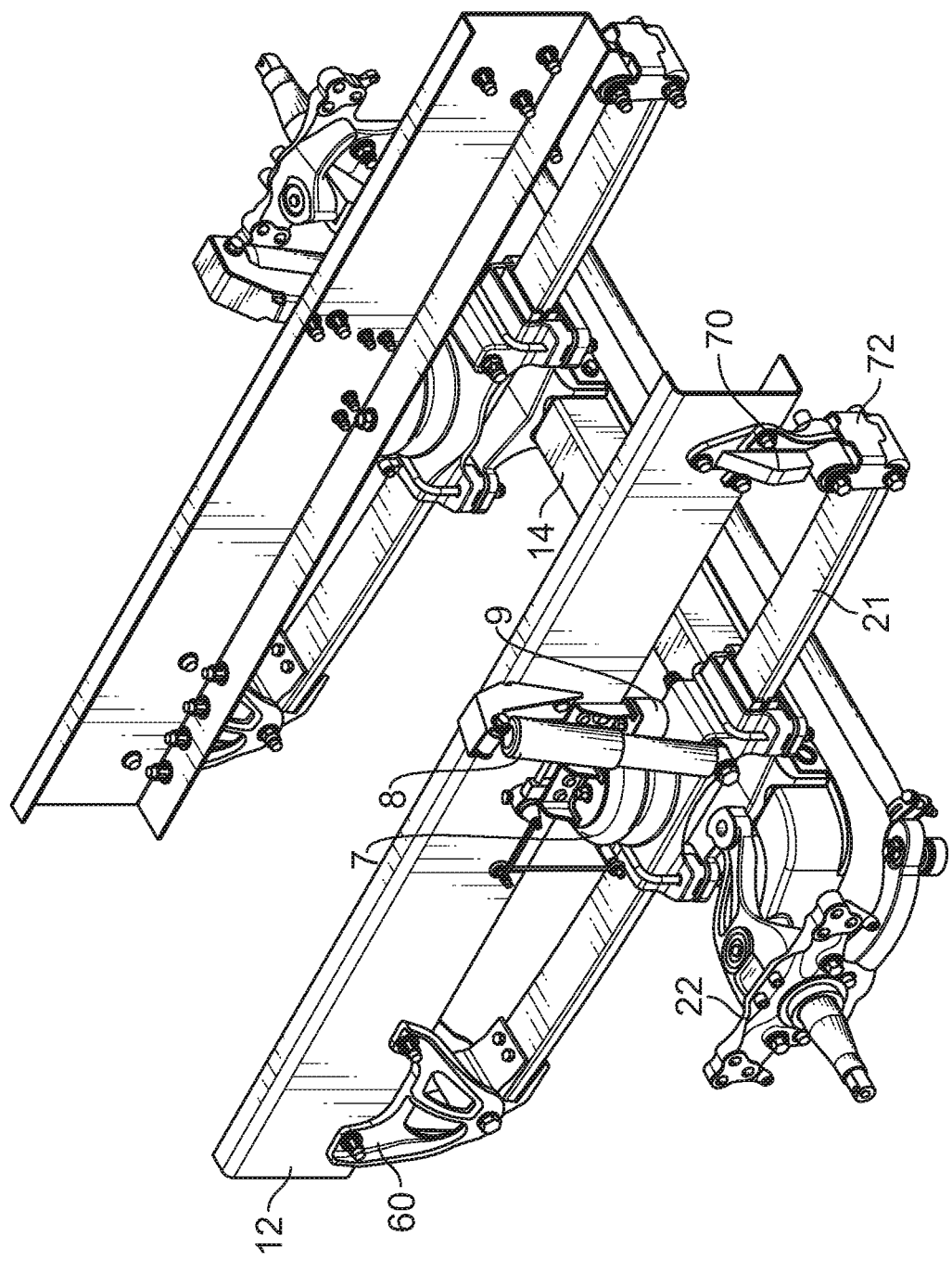
FIG. 2 is a left side, upper rear perspective of the subject matter of FIG. 1.
Figure 3:
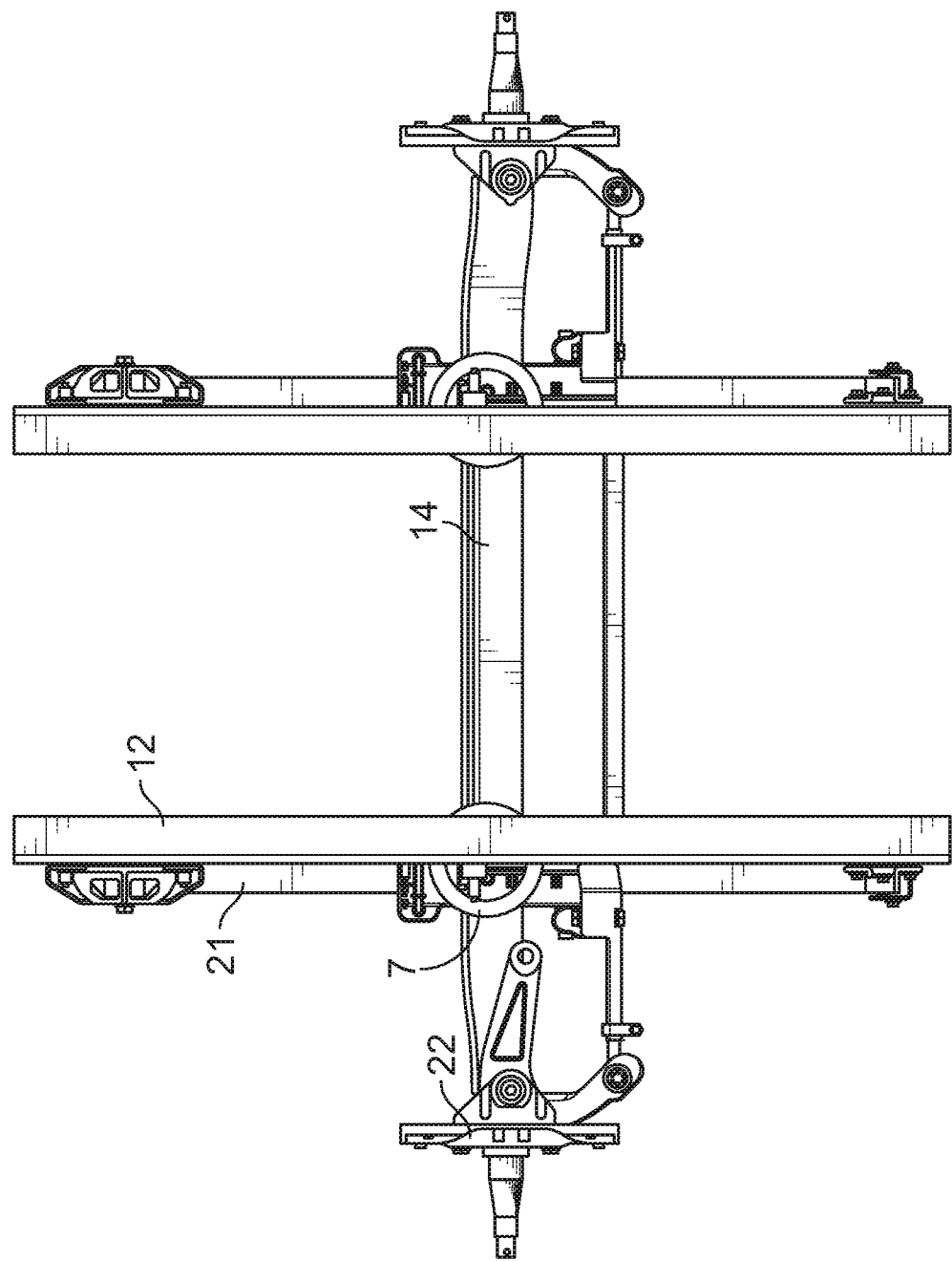
FIG. 3 is a top view of the subject matter of FIG. 1.
Figure 4:
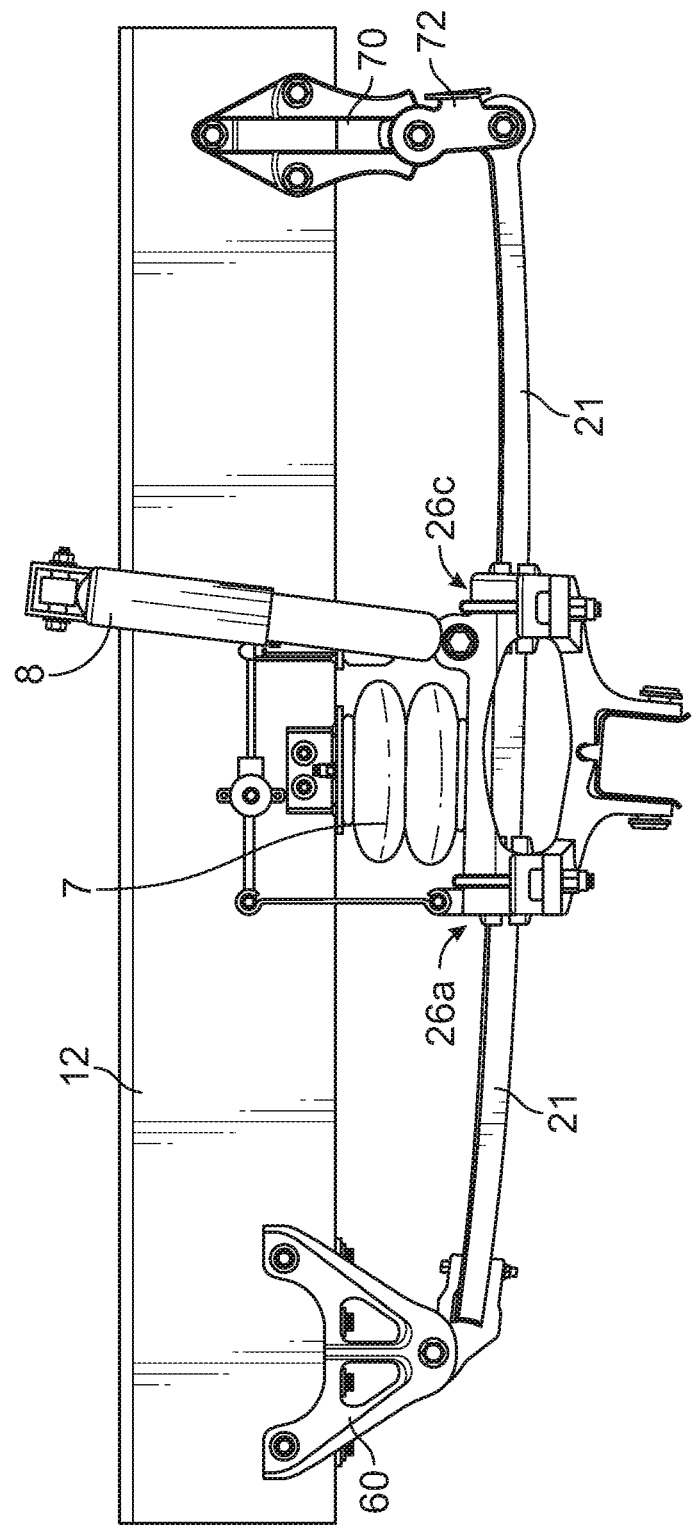
FIG. 4 is left side elevational view of the subject matter of FIG. 1 without the axle, steering knuckles and tie rod arm.

In the first example suspension system 10, the axle 14 is shown in FIGS. 1-2 as a fabricated axle that includes a laterally extending box section to provide high roll stability. A king pin 20 is operatively connected to each end of the fabricated axle 14, to which a steering knuckle 22 is pivotally connected. The axle 14 may be constructed of steel, or other suitable materials, and may be constructed in the manner described or by alternative manufacturing techniques to result in a fabricated or hollow axle member. The axle may also be of a more common solid axle construction without departing from the scope of the present disclosure.

Figure 6:
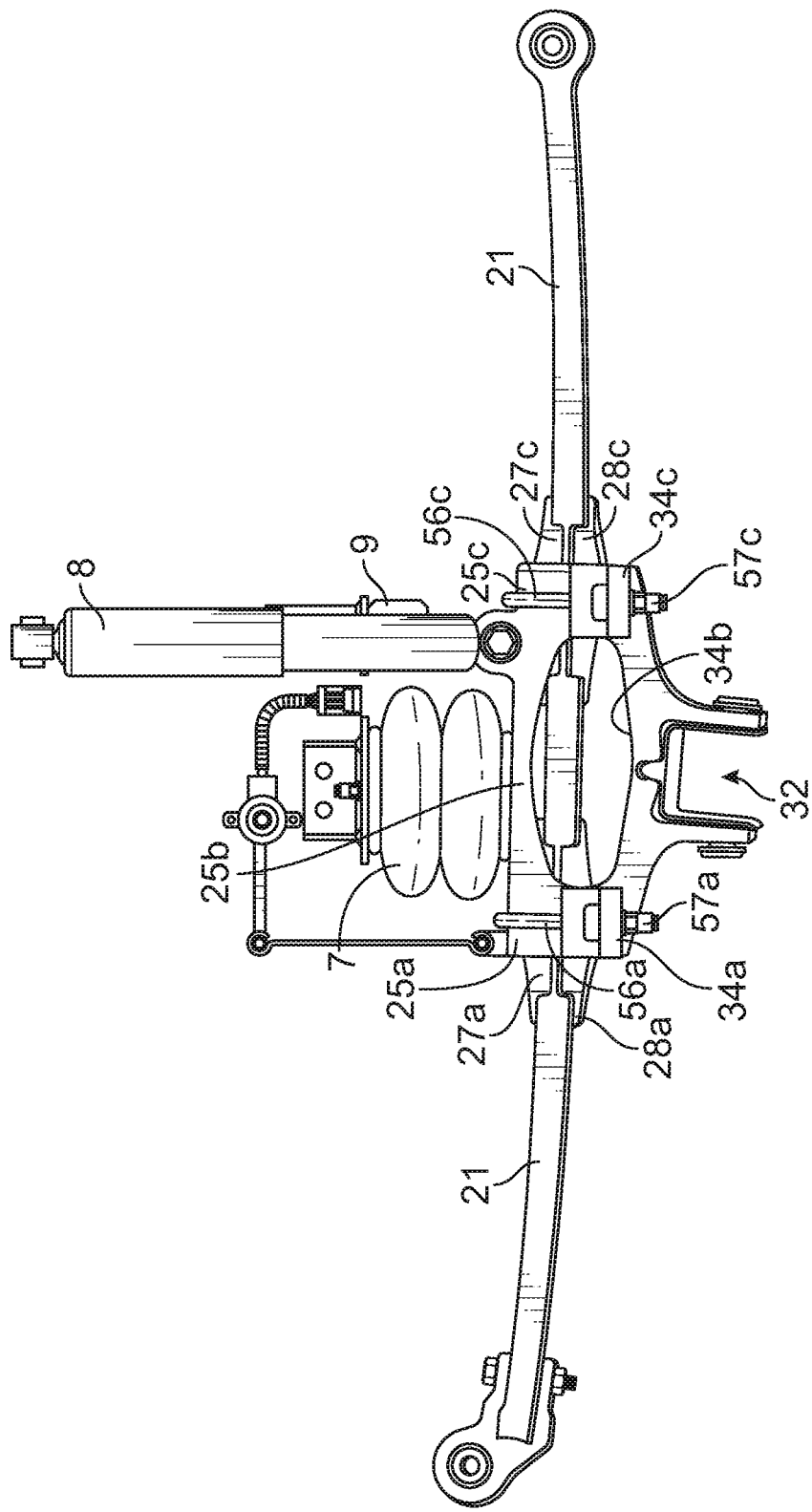
FIG. 6 is a left side elevational view of the embodiment shown in FIG. 5.
Figure 7:
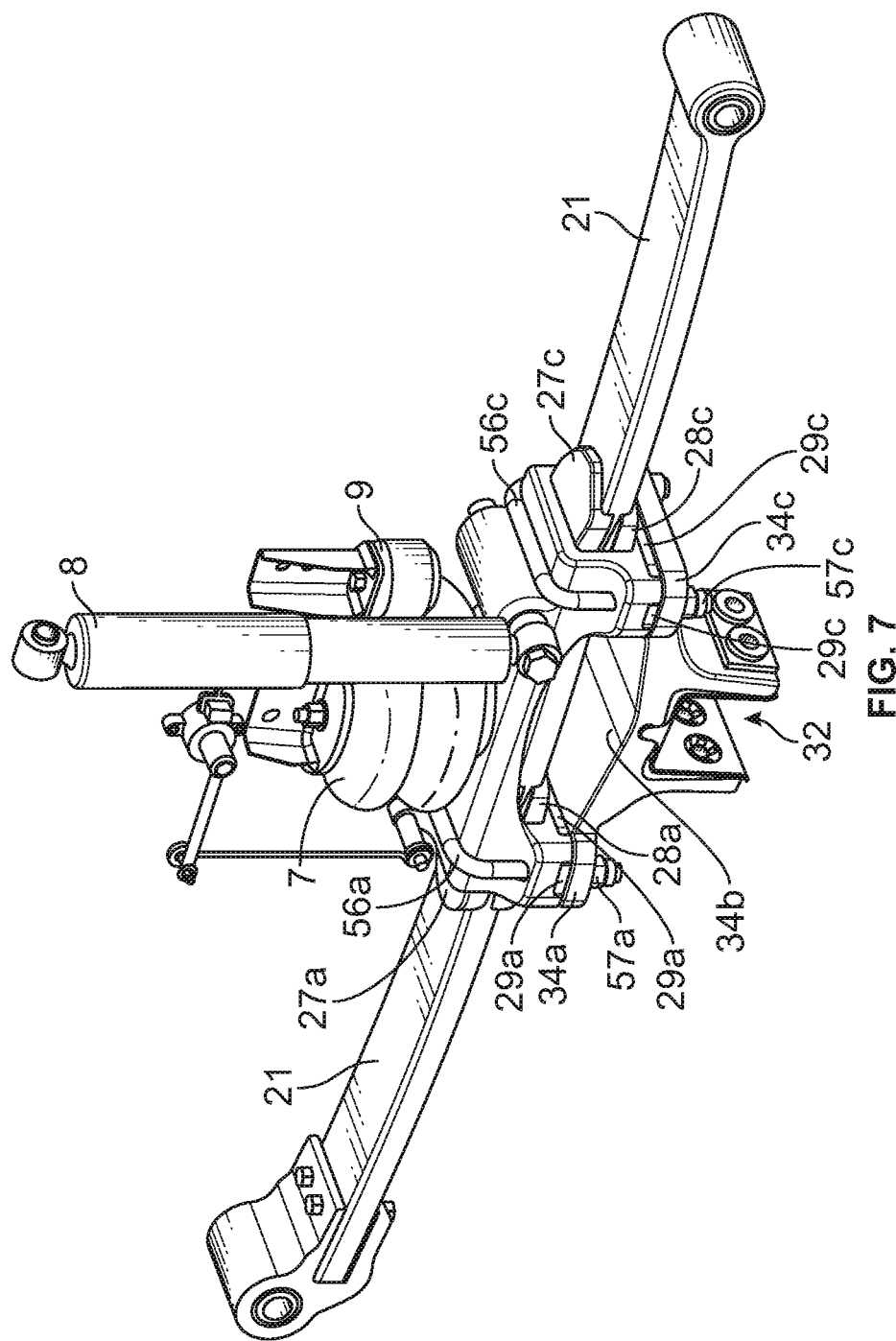
FIG. 7 is a left side, upper rear perspective view of the embodiment shown in FIGS. 5-6.
Figure 8:
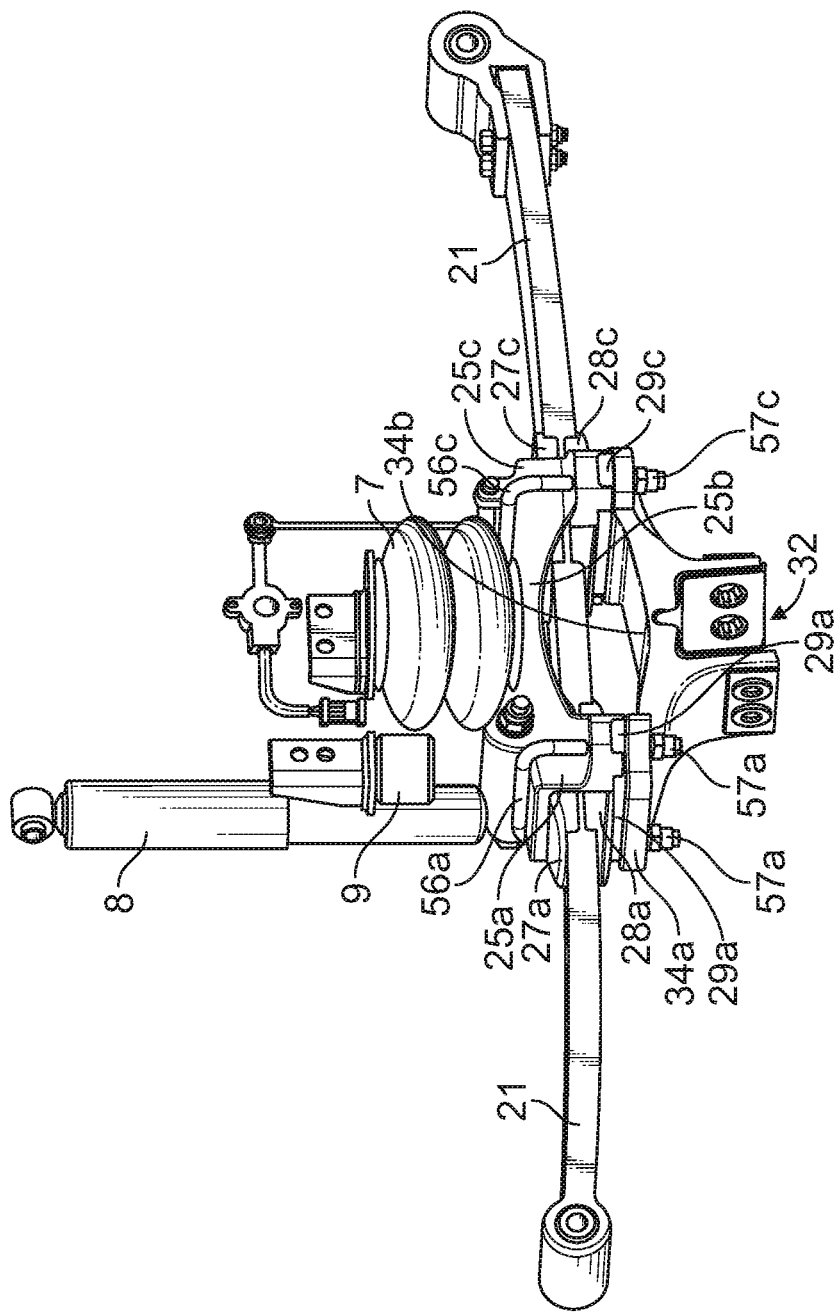
FIG. 8 is a right side, rear perspective view of the embodiment shown in FIGS. 5-7.
Figure 9:
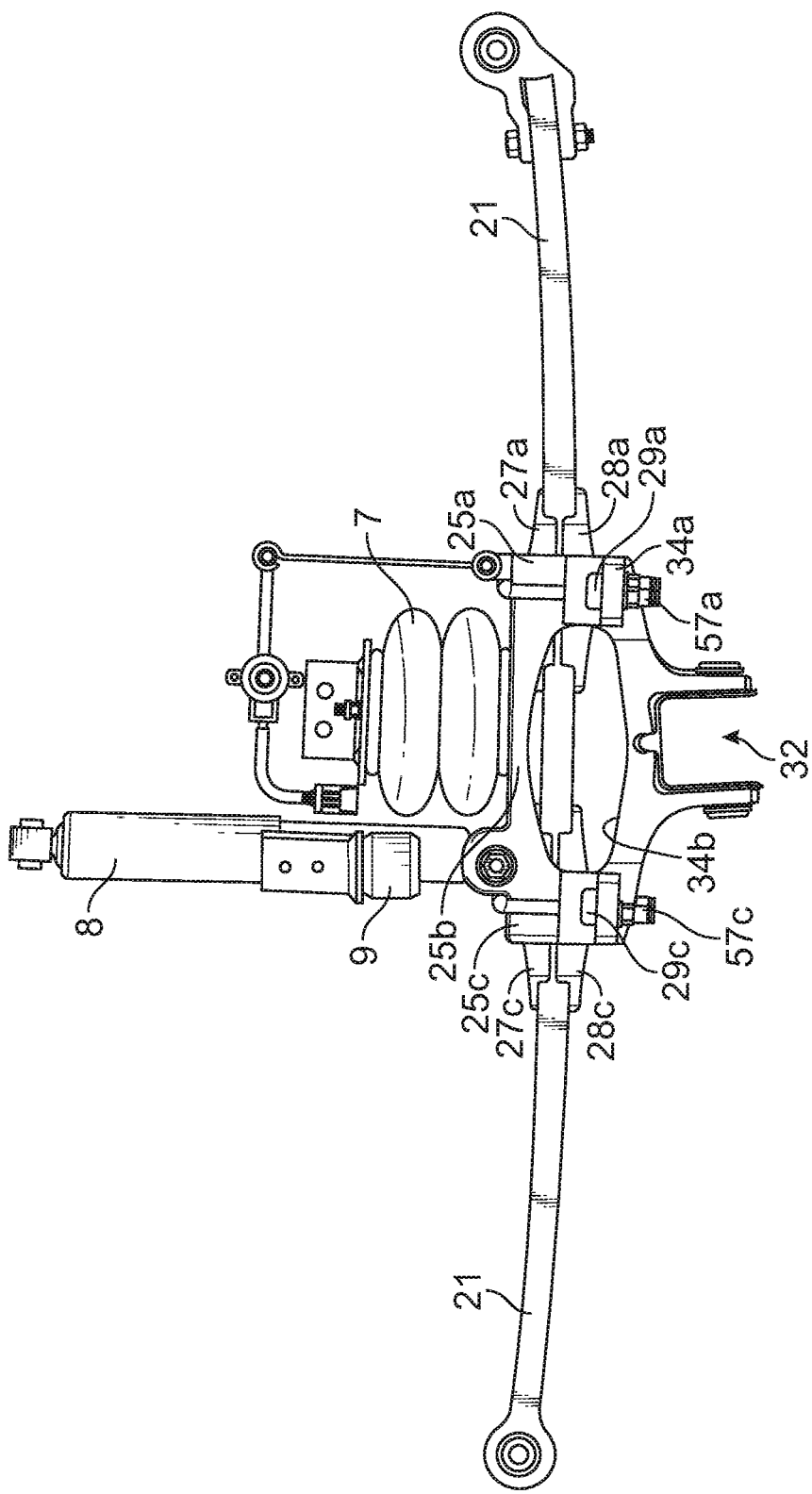
FIG. 9 is a right side, elevational view of the embodiment shown in FIG. 5-8.
Figure 10:
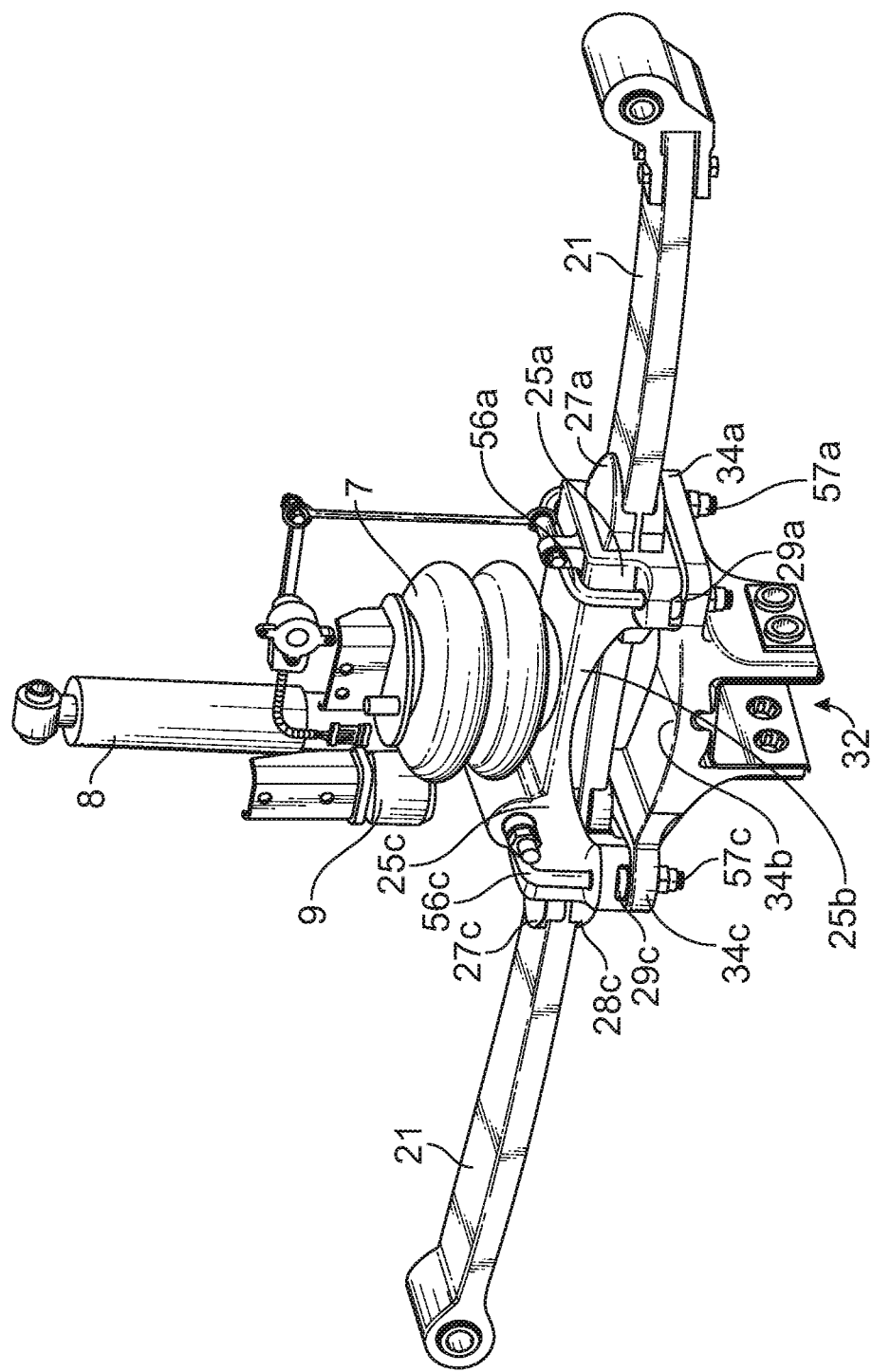
FIG. 10 is a right side, upper front perspective view of the embodiment shown in FIG. 5-9.
Figure 11:
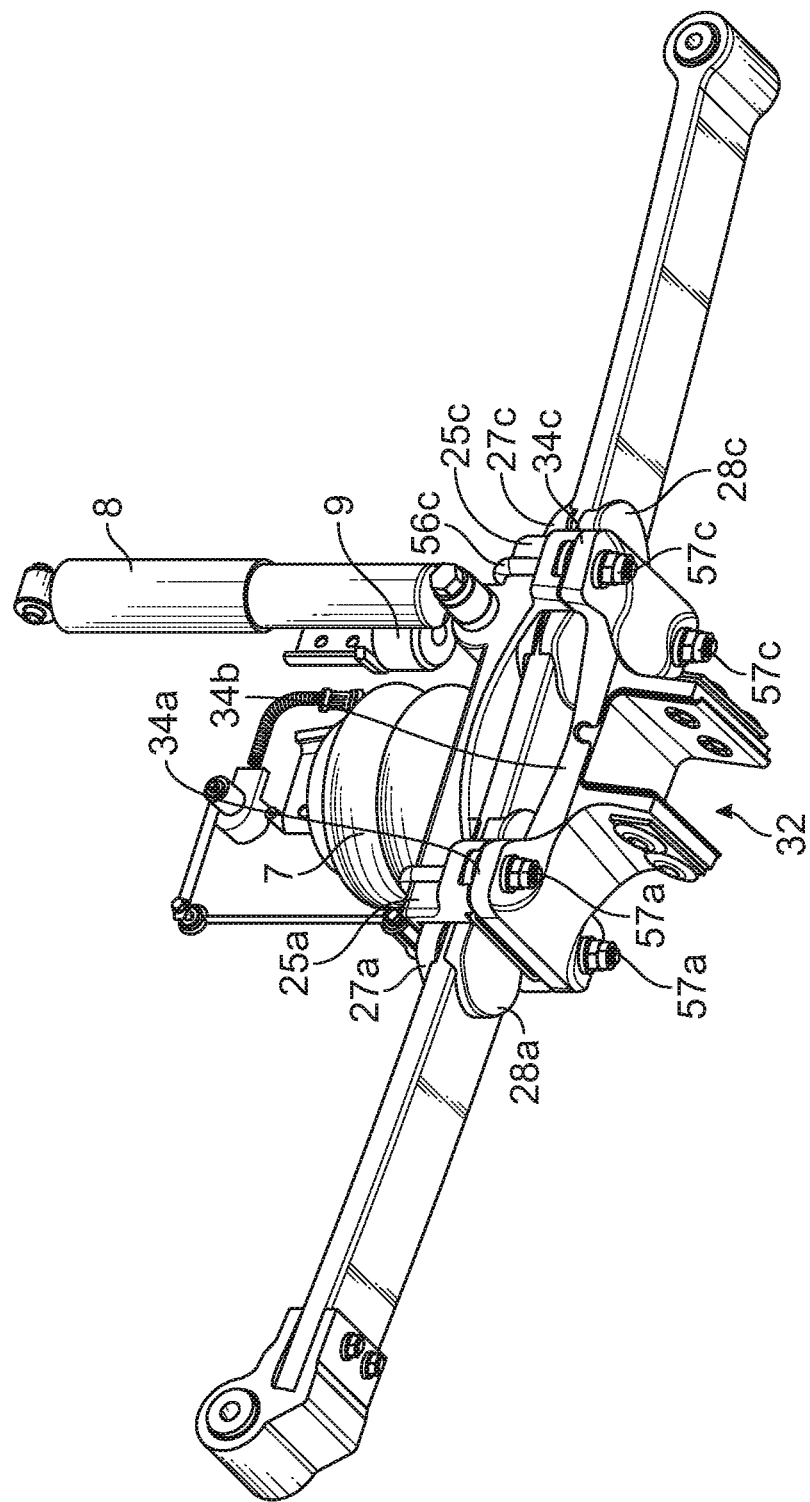
FIG. 11 is a left side, lower perspective view of the embodiment shown in FIG. 5-10.
Figure 12:
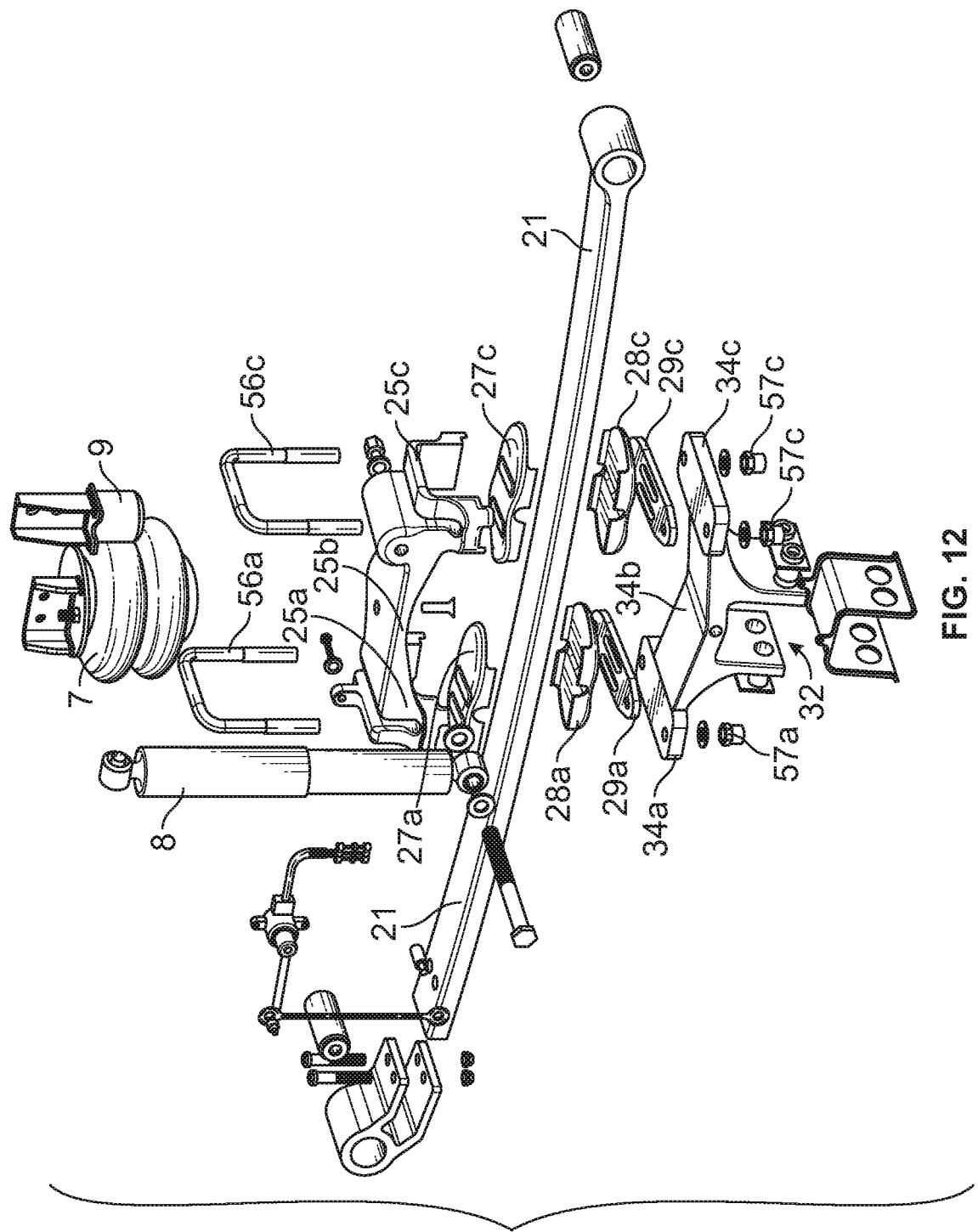
FIG. 12 is an exploded left, upper rear perspective view of the embodiment shown in FIG. 5-11.
Figure 13:
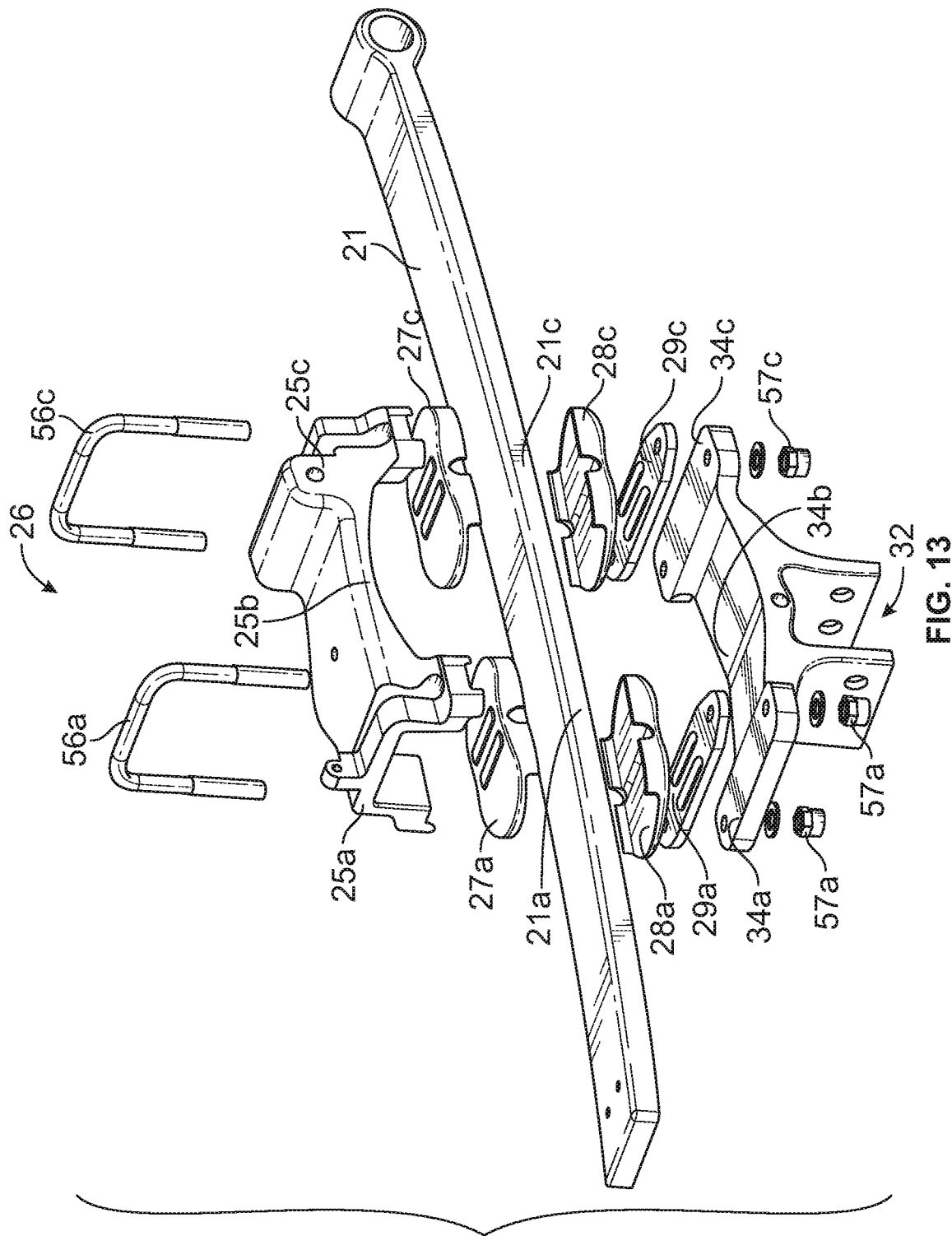
FIG. 13 is a an exploded, left side, upper perspective view of the embodiment shown in FIGS. 5-12 without the air spring, shock absorber, jounce stop (shock bracket), and axle liner.

The clamp assembly 26 connects the leaf spring to the axle and includes first and second clamp groups 26a, 26c which are separated along the length of a longitudinally oriented vehicle leaf spring 21 (FIGS. 6, 13). The first and second clamp groups 26a, 26c are positioned at respectively first and second seat sections 21a, 21c of the leaf spring 21. Slight lateral tapers at each seat section (21a, 21c in FIG. 15) facilitate the first and second clamp groups securing the leaf spring at these locations to resist both longitudinal and lateral forces experienced during use. Consistent with the foregoing, the first and second clamp groups may be positioned symmetrically or asymmetrically with respect to the axle or the length of the leaf spring.

Figure 5:
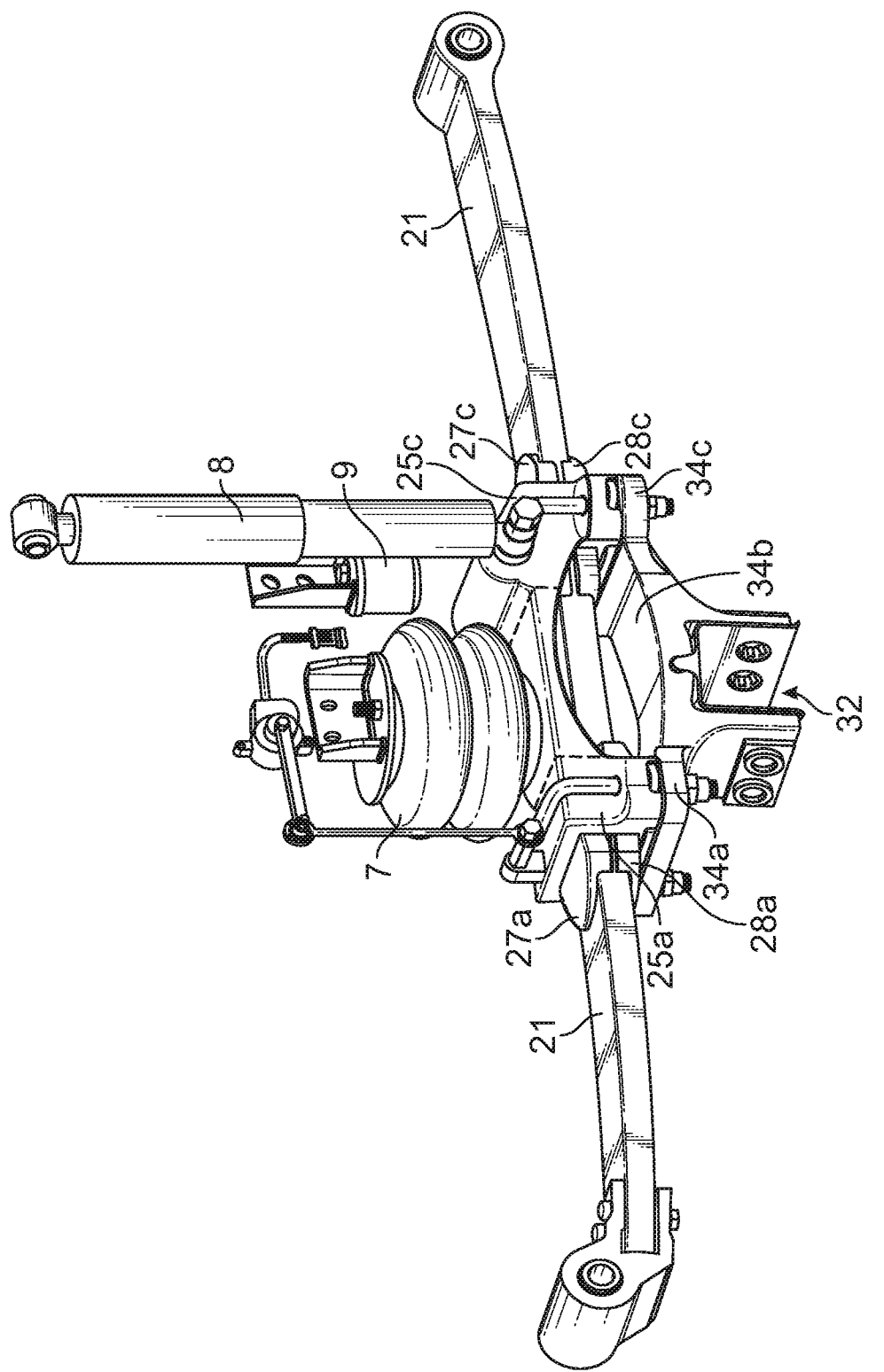
FIG. 5 is a left side, upper front perspective view of the first embodiment clamp assembly from the left side of the suspension system shown in of FIGS. 1-4. The example clamp assembly secures a leaf spring. Mounted to a top clamp plate is an air spring and shock absorber. A jounce stop (shock bracket) is also shown.

From the top downward, the first and second clamp groups 26a, 26c of the clamp assembly include, respectively, first and second top mounting pads 25a, 25c separated by a joining portion 25b, together constituting a top clamp plate; first and second top or upper elastomeric pads 27a, 27c; first and second bottom or lower elastomeric pads 28a, 28c; first and second support plates 29a, 29c; and first and second bottom mounting pads 34a, 34c, which are separated by concave upward, joining portion 34b and formed with axle seat bracket 32 (FIG. 13,6). Additional energy absorbing and damping devices such as an air spring 7, shock absorber 8, and jounce stop 9 (shock bracket) are present in the illustrated embodiment to demonstrate their feasibility and compatibility with the present disclosure. None of these devices, however, are required. The top joining portion 25b, positioned between the first and second top mounting pads 25a, 25c and denoted by dashed lines in FIG. 5, is optional and serves only as a platform for the air spring.

The top clamp plate 25, including the first and second top mounting pads 25a,25c, the first and second support plates 29a,29c, and the first and second bottom mounting pads 34a,34c with joining portion 34b and axle seat bracket 32 may be constructed from various materials including steel, ductile iron, aluminum, alloys or other suitable substantially rigid materials. It will also be appreciated that these pieces may be manufactured by any suitable method, such as by casting, forging, fabricating, machining or the like. The same material and/or method of manufacturing need not be used for each piece. Manufacturing of componentry also may include machining, for example, to drill and/or tap bores or to flatten or alter engagement surfaces, as further discussed herein.

As one example, for a 12,000 lbs. front steering axle suspension system utilizing a 60 inch long, 4 inch wide (1.5 inch thick) composite leaf spring, the length of each clamp group could be between 3 and 4 inches long, and the center distance between the first and second clamp groups could be 10 inches or greater and, in particular, could be between 13 and 14 inches. It will be appreciated however the relative dimensions of the spread active clamp designs of the present disclosure, and the components thereof, may vary as expected in accordance with parameters that include the dimensions and type of leaf spring used and the load and packaging constraints of the particular suspension system.

Figure 17:
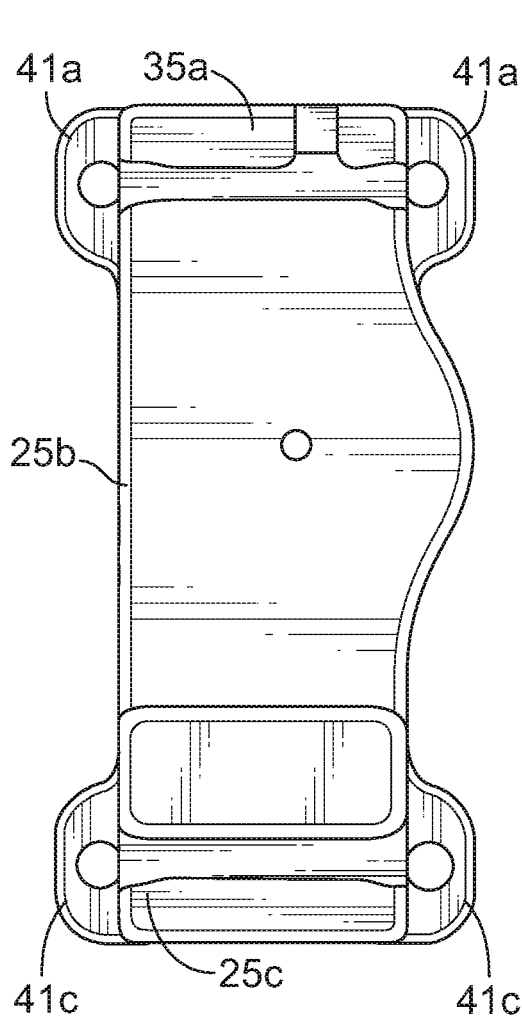
FIG. 17 is a top view of the top clamp plate of the embodiment shown in FIGS. 1-14.
Figure 18:
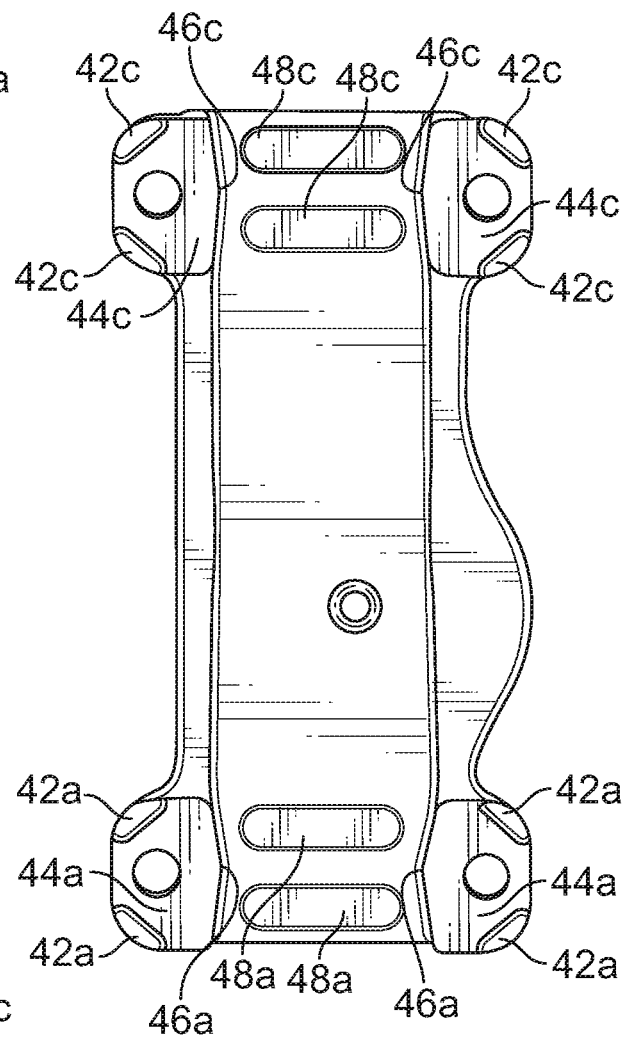
FIG. 18 is a bottom view of the top clamp plate of the embodiment shown in FIGS. 1-14.
Figure 19:
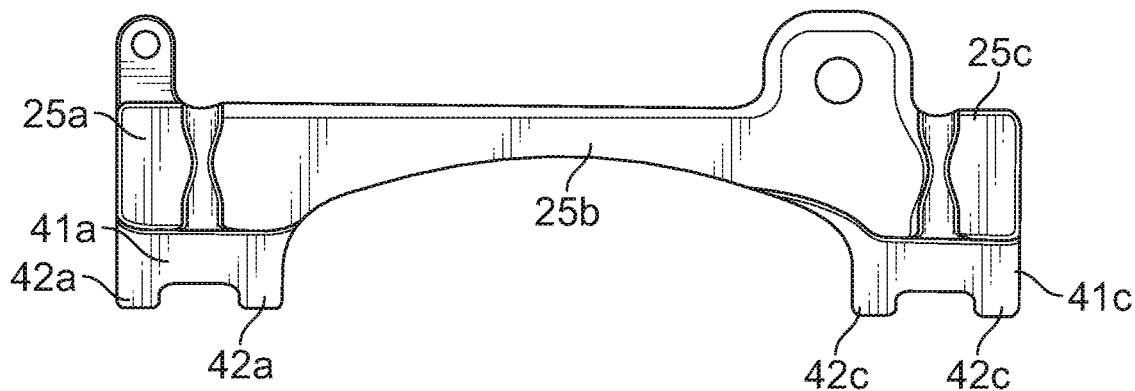
FIG. 19 is left side view of the top clamp plate of the embodiment shown in FIGS. 1-14.
Figure 20:
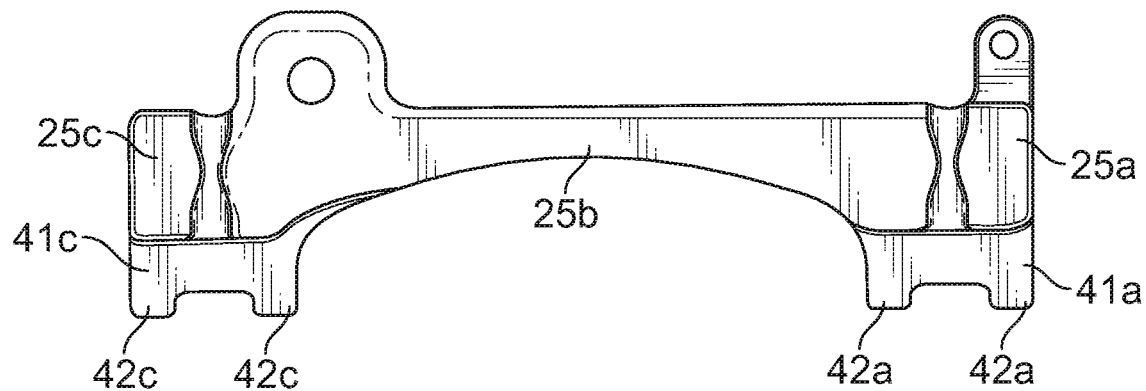
FIG. 20 is right side view of the top clamp plate of the embodiment shown in FIGS. 1-14.
Figure 21:
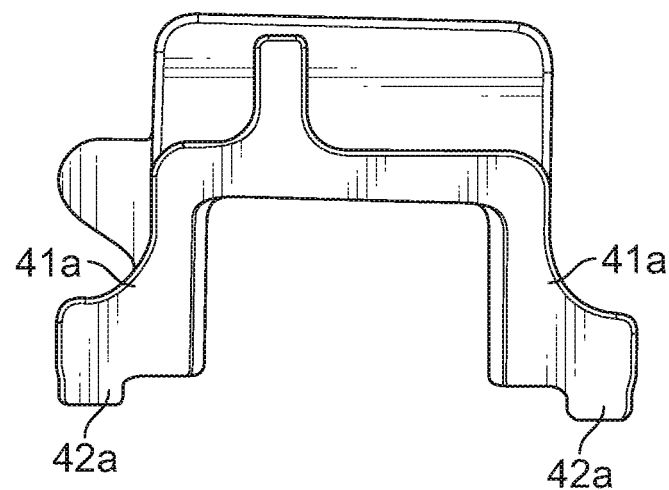
FIG. 21 is a front end view of the top clamp plate of the embodiment shown in FIGS. 1-14.
Figure 22:
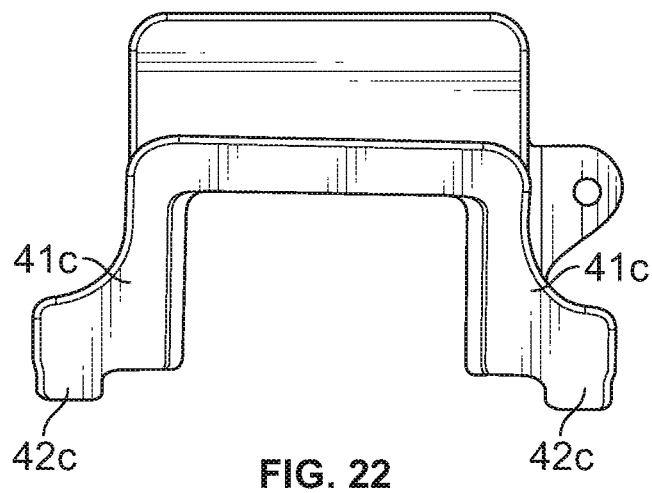
FIG. 22 is a rear end view of the top clamp plate of the embodiment shown in FIGS. 1-14.
Figure 23:
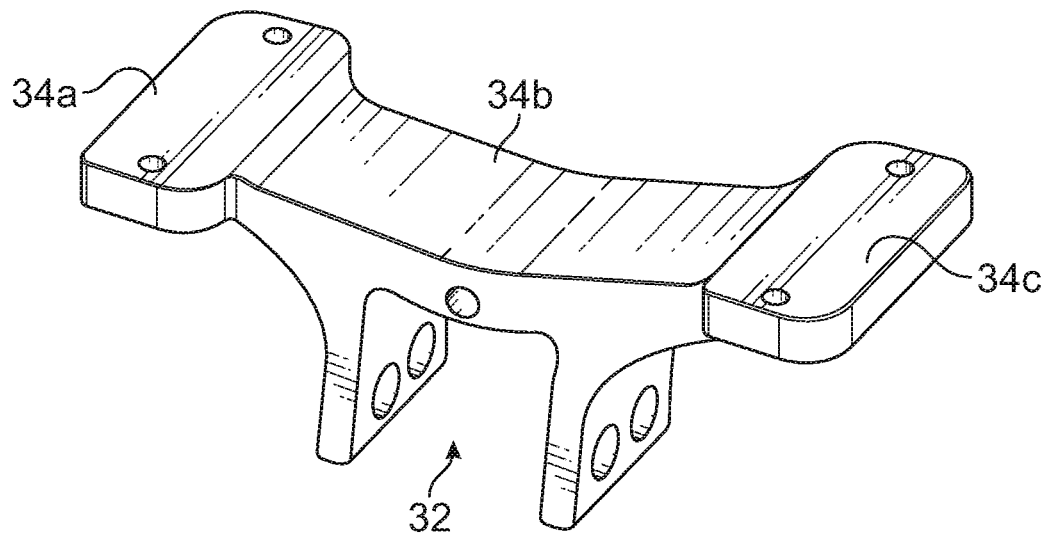
FIG. 23 is a left side, upper view of the first and second bottom mounting pads formed as part of an axle seat bracket which appears in the embodiment of FIGS. 1-14.
Figure 24:
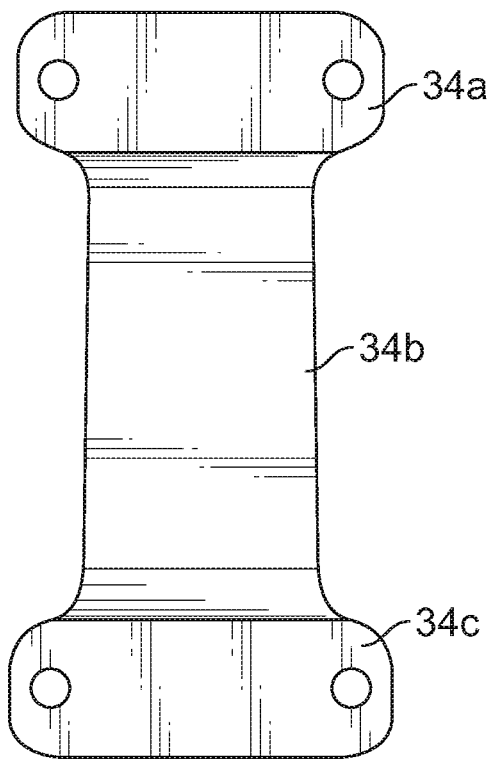
FIG. 24 is a top view of the first and second bottom mounting pads formed as part of an axle seat bracket which appears in the embodiment of FIGS. 1-14.
Figure 25:
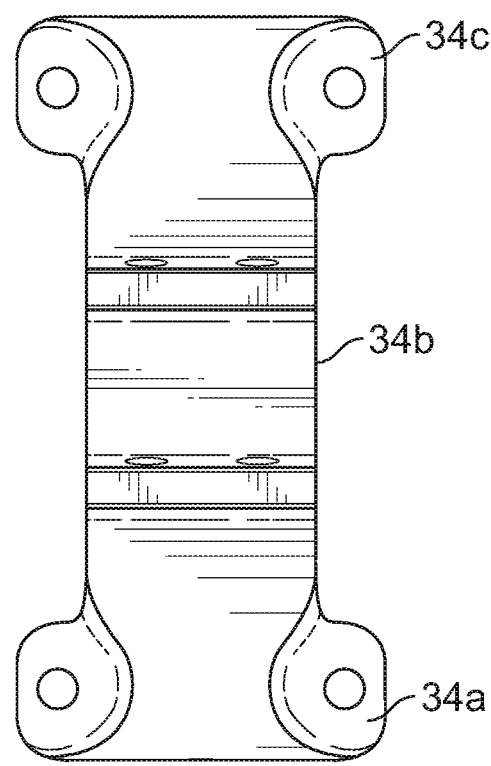
FIG. 25 is a bottom view of the first and second bottom mounting pads formed as part of an axle seat bracket which appears in the embodiment of FIGS. 1-14.
Figure 26:
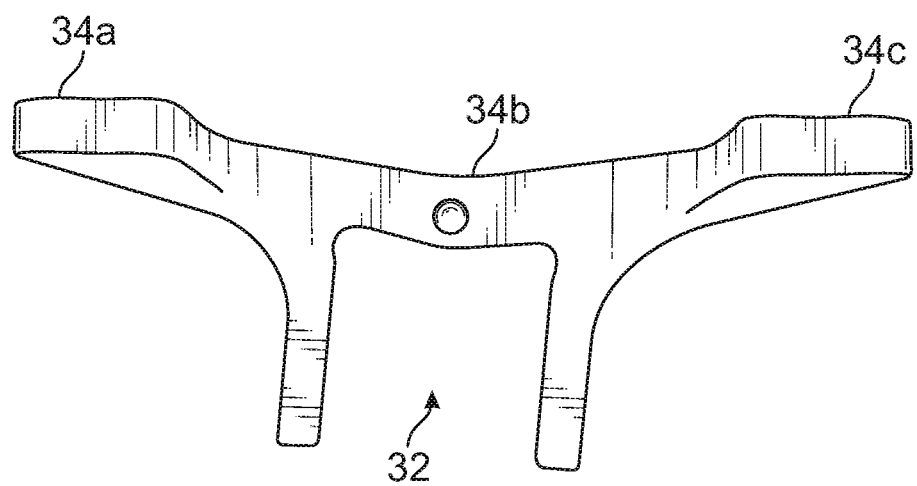
FIG. 26 is a left side view of the first and second bottom mounting pads formed as part of an axle seat bracket which appears in the embodiment of FIGS. 1-14.
Figure 27:
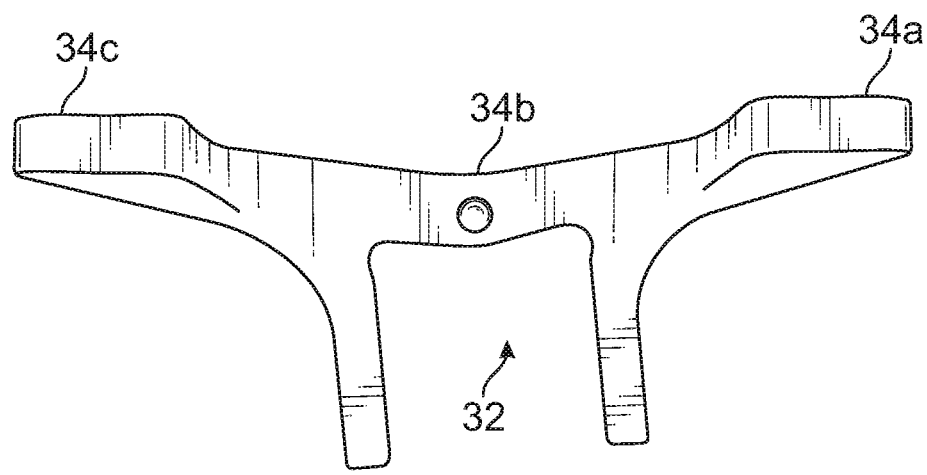
FIG. 27 is a right side view of the first and second bottom mounting pads formed as part of an axle seat bracket which appears in the embodiment of FIGS. 1-14.
Figure 28:
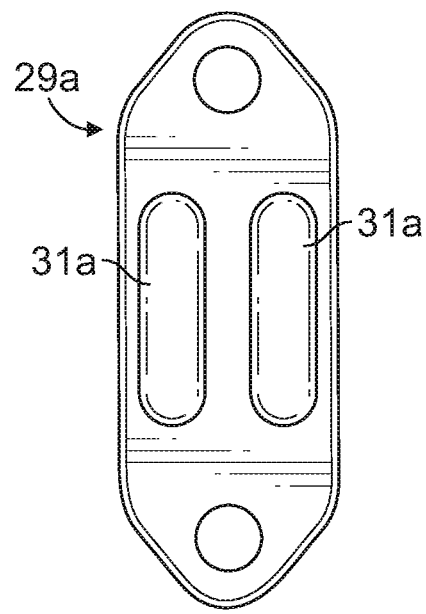
FIG. 28 is a top view of a support plate of the embodiment of FIGS. 1-14 and which is configured to receive an elastomeric pad.
Figure 29:
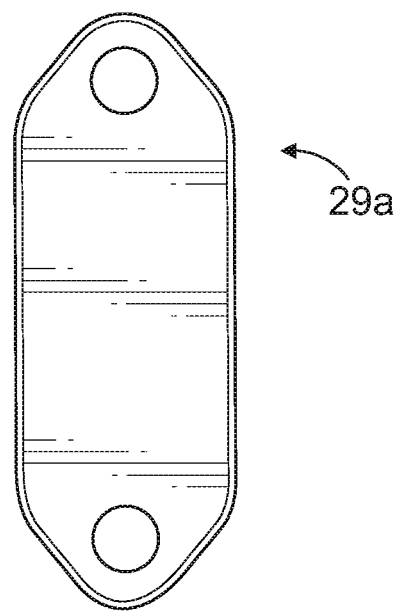
FIG. 29 is a bottom view of the support plate shown in FIG. 28.
Figure 34:
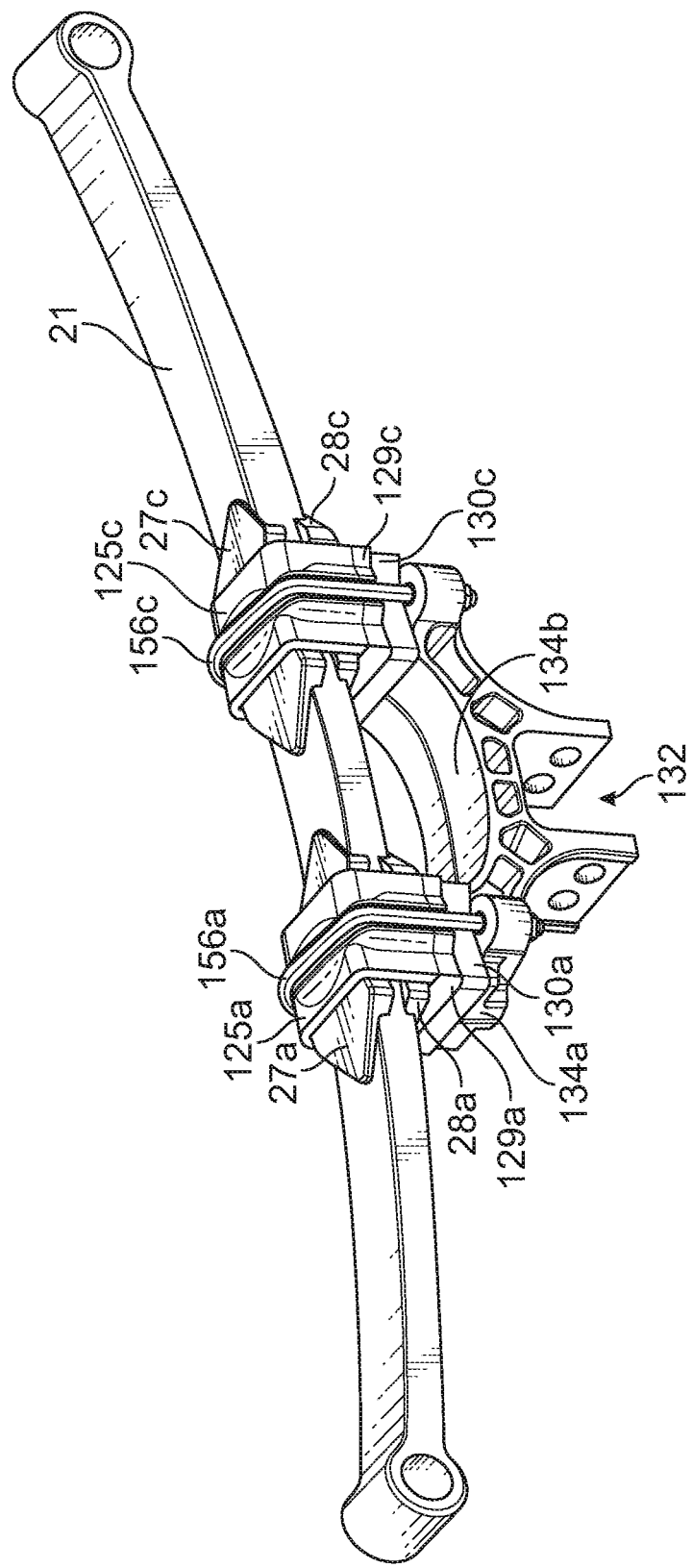
FIG. 34 is a left side, upper front perspective view of a clamp assembly according to a second embodiment of the present disclosure.

In the illustrated first embodiment, first and second mounting pads $25a$, $25c$ define on their underside a pair of laterally disposed, elongated grooves $48a$, $48c$ (FIGS. 17,18). Raised projections or teeth $42a$, $42c$ positioned on the perimeter of the bottom surface $44a$, $44c$ of downwardly extending mounting pad legs or flanges $41a$, $41c$ locate and restrain horizontally, first and second support plates $29a$, $29c$, each of which has upwardly facing, elongated groove pairs $31a$, $31c$ and is positioned atop an associated bottom mounting pad $34a$, $34c$ (FIGS. 5,10,13,18)

Generally vertical, interior surfaces of downwardly extending, top mounting pad legs $41a$, $41c$ define first and second opposing wedge pairs $46a$, $46c$ which extend above, adjacent to and below the leaf spring 21 and are also positioned outside of and between respectively associated elongated groove pairs $48a,48c$, $31a,31c$ of first and second top mounting pads $25a$, $25C$ and support plates $29a,29c$ (FIGS. 7-10,18).

Figure 14:
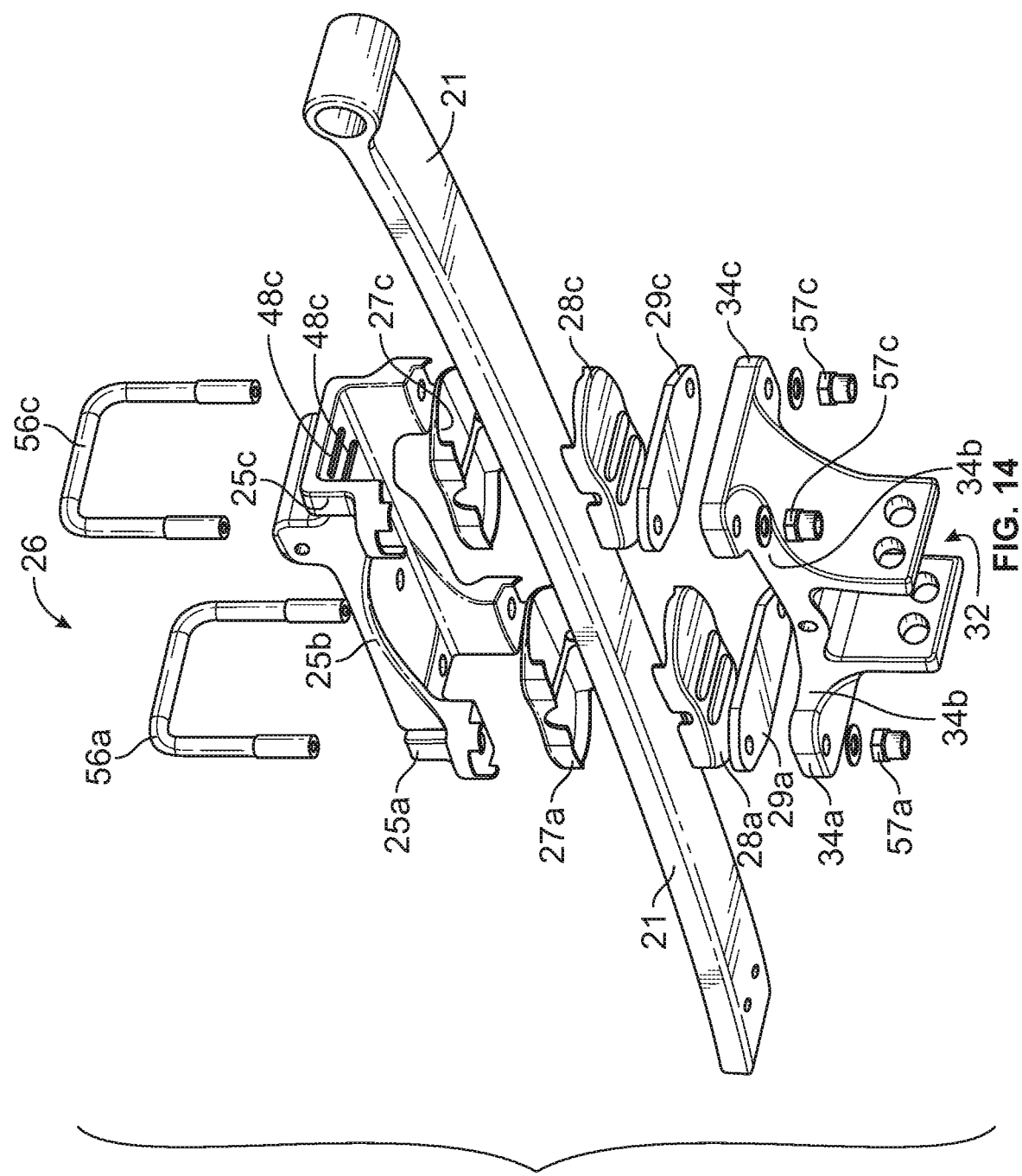
FIG. 14 is an exploded, left side, lower perspective view of the embodiment shown in FIG. 13.
Figure 15:
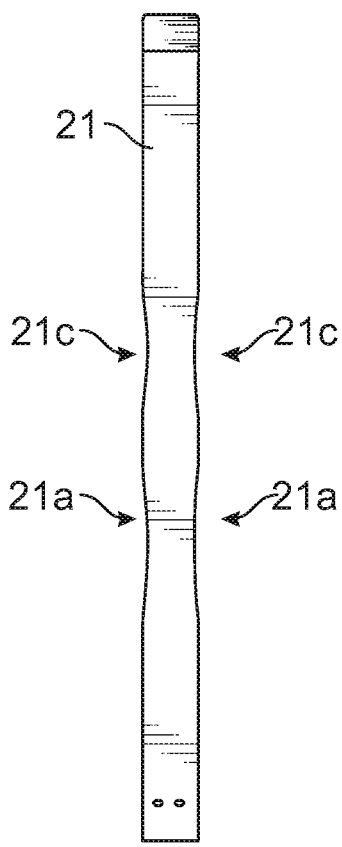
FIG. 15 is top perspective view of the leaf spring shown in FIGS. 1-14.
Figure 16:
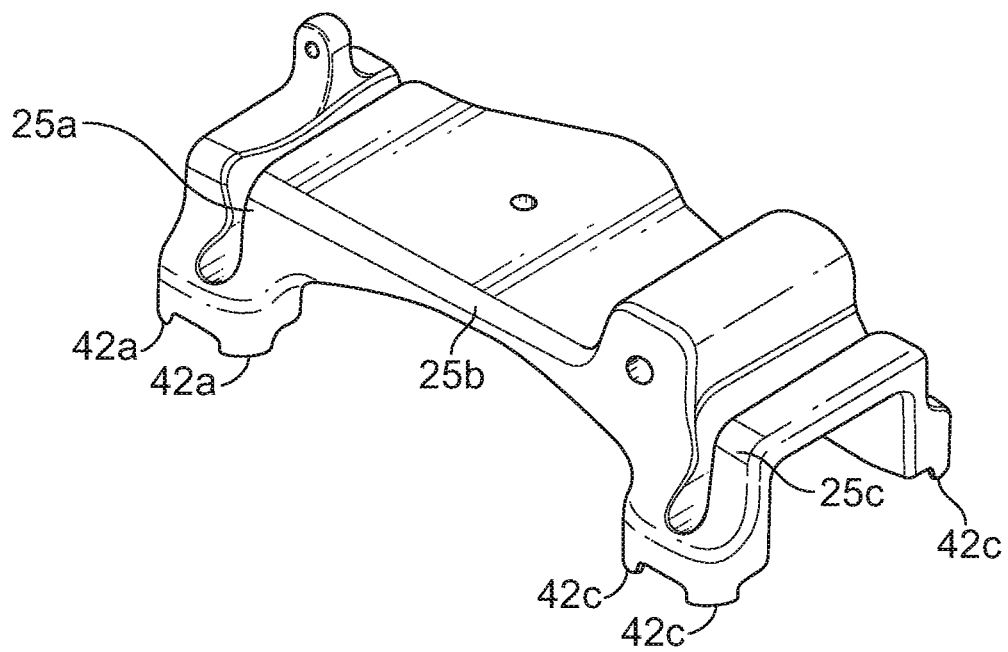
FIG. 16 is a left side, upper perspective view of the top clamp plate of the embodiment shown in FIGS. 1-14.

Elastomeric pads $27a,27c,28a,28c$ made of a high durometer rubber or other suitable elastomeric material are positioned at first and second seat sections $21a,21c$, above and below the leaf spring 21 (FIG. 6). (Different reference numbers are used for the elastomeric pads to distinguish their locations; all four of the elastomeric pads are of the same shape and material of construction but such is not a requirement of the present disclosure). Laterally disposed, elongated projections (55 in FIGS. 30,32) on the top wall or roof of the elastomeric pads are received within the corresponding laterally disposed, elongated groove pairs ($48a$, $48c,31a,31c$) of the first and second top mounting pads $25a,25c$ and support plates $29a,29c$ (FIGS. 13,14). The underside of the top wall 51 of the elastomeric pads defines a generally arcuate recess or groove (58 in FIGS. 31,32) which extends across the midsection of the elastomeric pad through opposing side walls 54 extending downwardly from the top wall (51 in FIG. 33) defining a passage or channel that receives the leaf spring. Relative to the longitudinal axis of the leaf spring, this midsection groove is disposed between and generally in parallel with, but horizontally and vertically offset from, the associated pair of elongated projections 55 on the opposite or top side of top wall (51 in FIG. 32), resulting in the groove forming a living hinge across the width of the elastomeric pad. Opposing side walls 54 are oriented to taper inward as they traverse the lateral edge of the elastomeric pad towards its midsection (FIGS. 31-33). The lateral taper in the opposing sidewalls of corresponding top and bottom elastomeric pads and seat section of the leaf spring, and the opposing vertical wedges $46a,46c$ on the interior of the top mounting pad legs, are all in registration with one another when assembled and assist in forming a mechanical lock to longitudinally and laterally restrain the leaf spring during use.

Elastomeric pads $27a,27c,28a,28c$ may be fixedly secured to the leaf spring with various materials and/or techniques, such as for example, through the use of an adhesive, mold-bonding or other suitable approaches without departing from the present disclosures. Alternative arrangements and structures could also be used to create or enhance interference between the elastomeric pad and the top mounting pad or equivalent structure that receives the elastomeric pad. For example, alternatively shaped elongated and non-elongated types of projections could be used. As a further example, the projections and corresponding recesses of the respective structures could also be reversed.

The clamp assembly 26 also includes first and second fastener assemblies ($56a,57a,56c,57c$), which in the illustrated embodiment are hardened U-shaped fasteners $56a,57a$ and connectors $56c,57c$. Each threaded U shape fastener $56a,56c$ is received within a groove that traverses across a corresponding top mounting pad $25a,25c$. The legs of the U-shaped fasteners $56a,56c$ are received within bores of the top, support plate and bottom mounting pad. When tightened, each U-shaped fastener assembly clamps together the associated top mounting pad, top elastomeric pad, leaf spring section, bottom elastomeric pad, support plate, and bottom mounting pad.

Desired caster or pinion angle may be achieved in a number of ways without departing from the scope of the present disclosure. A fixed caster or pinion angle can be built into the axle seat bracket (32 in FIGS. 6,26,27) which shows the first and second bottom mounting pads $34a,34c$ separated by joining portion $34b$, all of which are formed with or incorporated into the axle seat bracket 32. The second bottom mounting pad $34c$ is higher in elevation than the first mounting pad $34a$ relative to a plane perpendicular to the front and back axle walls. Alternatively, a fixed caster or pinion angle may be included within the clamp assembly 21 by including it within the configuration of a spacer (not shown) positioned between the leaf spring 21 and the first and second mounting pads that are positioned between these mounting pads and the axle.

A second embodiment of clamp assembly 126 of the present disclosure that utilizes two separate and active clamp groups $126a,126c$ is shown in FIGS. 34-41 and includes many of the same components previously described in the first embodiment. Accordingly, the same reference numerals and descriptions above with respect to the first example apply as to those same components.

Figure 35:
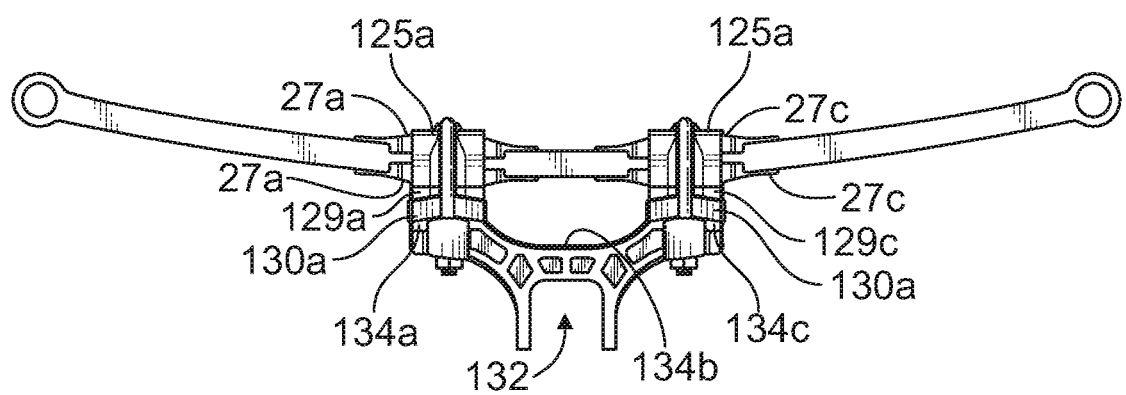
FIG. 35 is a left side, elevational view of the embodiment shown in FIG. 34.
Figure 36:
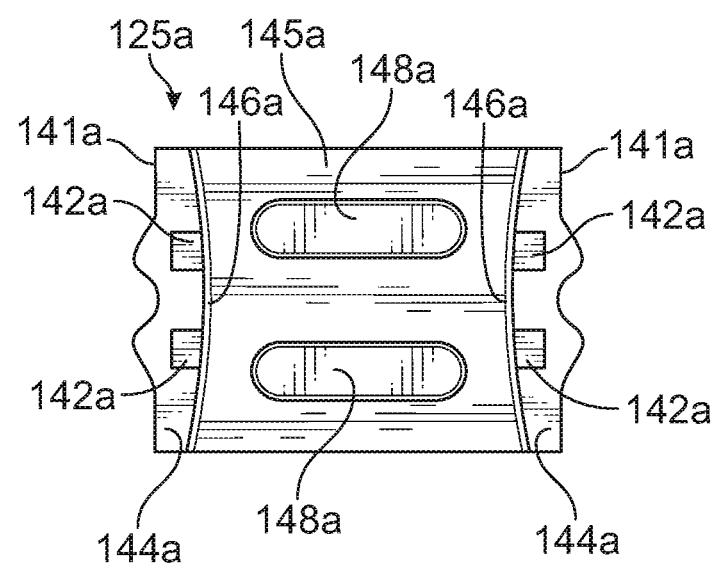
FIG. 36 is a bottom plan view of a top mounting pad of the embodiment shown in FIG. 34-35.
Figure 37:
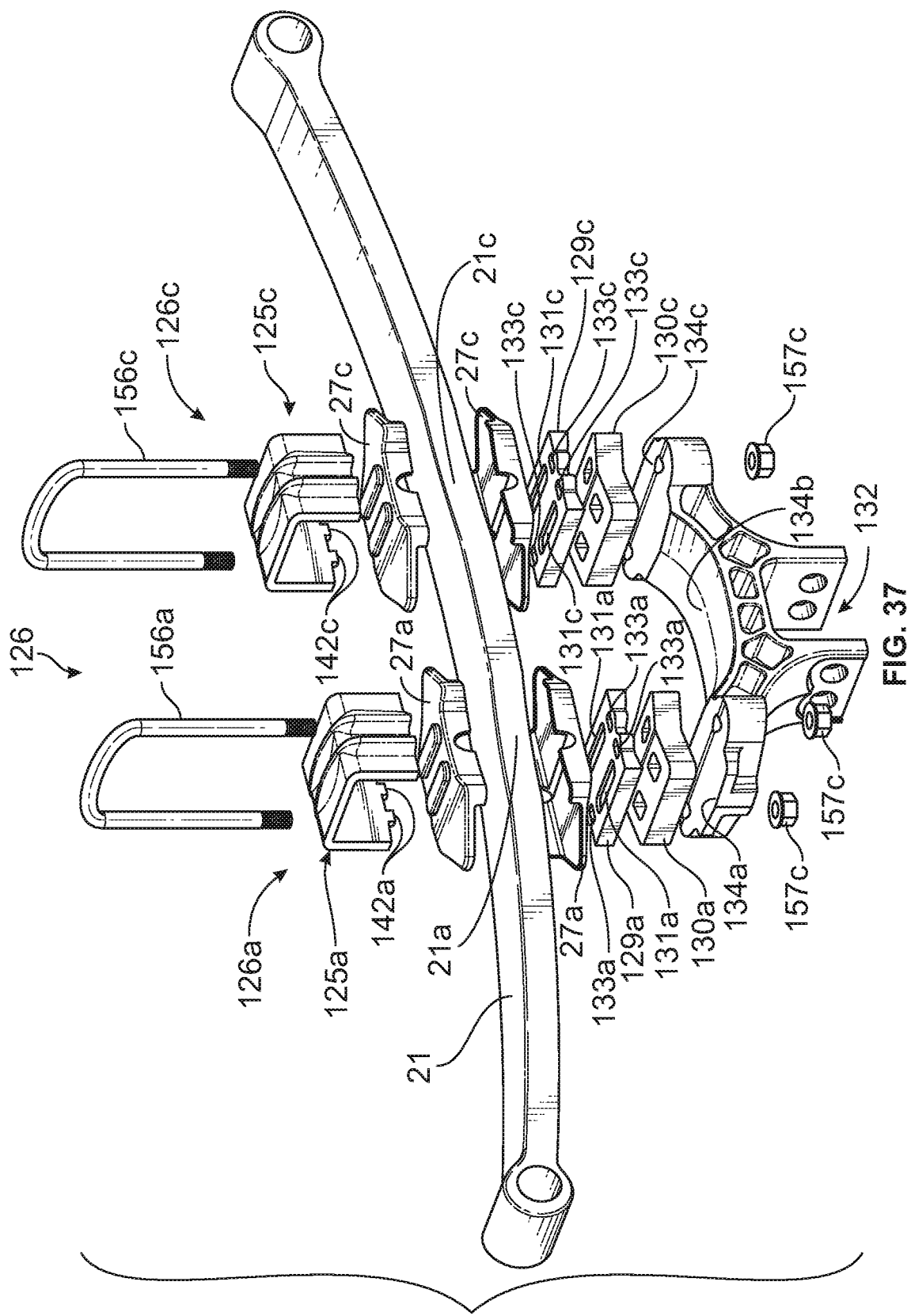
FIG. 37 is an exploded, left side, upper perspective view of the embodiment shown in FIGS. 34-35.

As may be seen in FIGS. 34-41, the clamp assembly 126 includes first and second clamp groups $126a,126c$ which are separated along the length of a longitudinally oriented vehicle leaf spring 21. The first and second clamp groups may be positioned symmetrically or asymmetrically with respect to the axle or the length of the leaf spring. From the top downward, the first and second clamp groups $126a,126c$ include, respectively, first and second top mounting pads $125a,125c$; first and second top or upper elastomeric pads $27a$, $27c$; first and second bottom or lower elastomeric pads $28a,28c$; first and second support plates $129a,129c$; first and second spacer plates $130a,130c$; and first and second bottom mounting pads $134a,134c$, which are separated by concave upward, joining portion $134b$ and are formed with axle seat bracket 132 (FIGS. 35,37).

First and second top mounting pads $125a,125c$, first and second support plates $129a,129c$, and first and second bottom mounting pads $134a,134c$ with joining portion $134b$ and axle seat bracket 132 may be constructed from various materials including steel, ductile iron, aluminum, alloys or other suitable substantially rigid materials. It will also be appreciated that these pieces may be manufactured by any suitable method, such as by casting, forging, fabricating, machining or the like. The same material and/or method of manufacturing need not be used for each piece. Manufacturing of componentry also may include machining, for example, to drill and/or tap bores or to flatten or alter engagement surfaces, as further discussed herein.

As one example, for a 12,000 lbs. front steering axle suspension system utilizing a 60 inch long, 4 inch wide (1.5 inch thick) composite leaf spring, the length of each clamp group could be between 3 and 4 inches long, and the center distance between the first and second clamp groups could be 10 inches or greater and, in particular, could be between 13 and 14 inches. It will be appreciated however the relative dimensions of the spread active clamp designs of the present disclosure, and the components thereof, may vary as expected in accordance with parameters that include the dimensions and type of leaf spring used and the load and packaging constraints of the particular suspension system.

Figure 38:
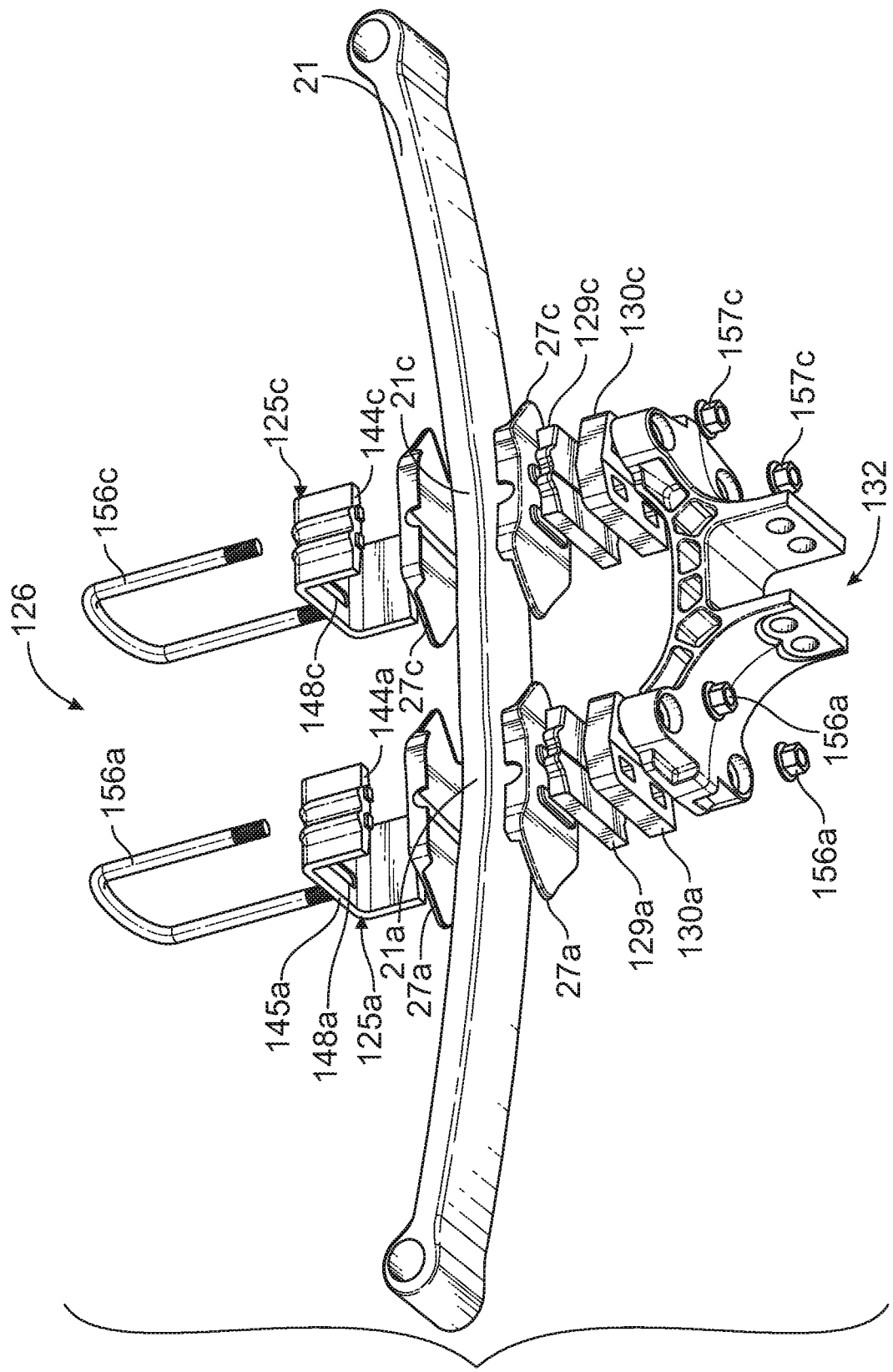
FIG. 38 is an exploded, left side, bottom perspective view of the embodiment shown in FIGS. 34-35 and 37.
Figure 39:
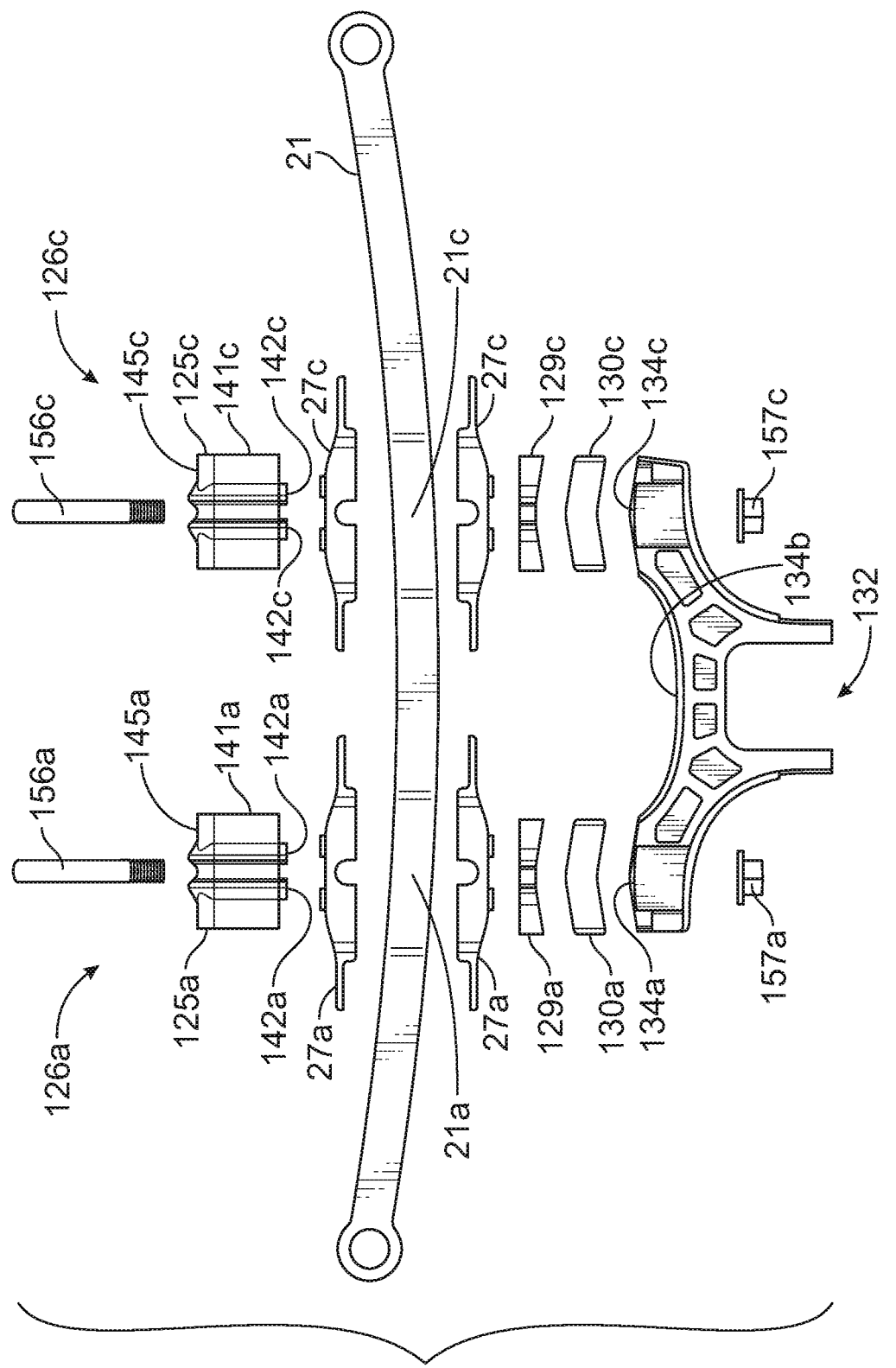
FIG. 39 is an exploded, left side, elevational view of the embodiment shown in FIGS. 34-35 and 37-38.
Figure 40:
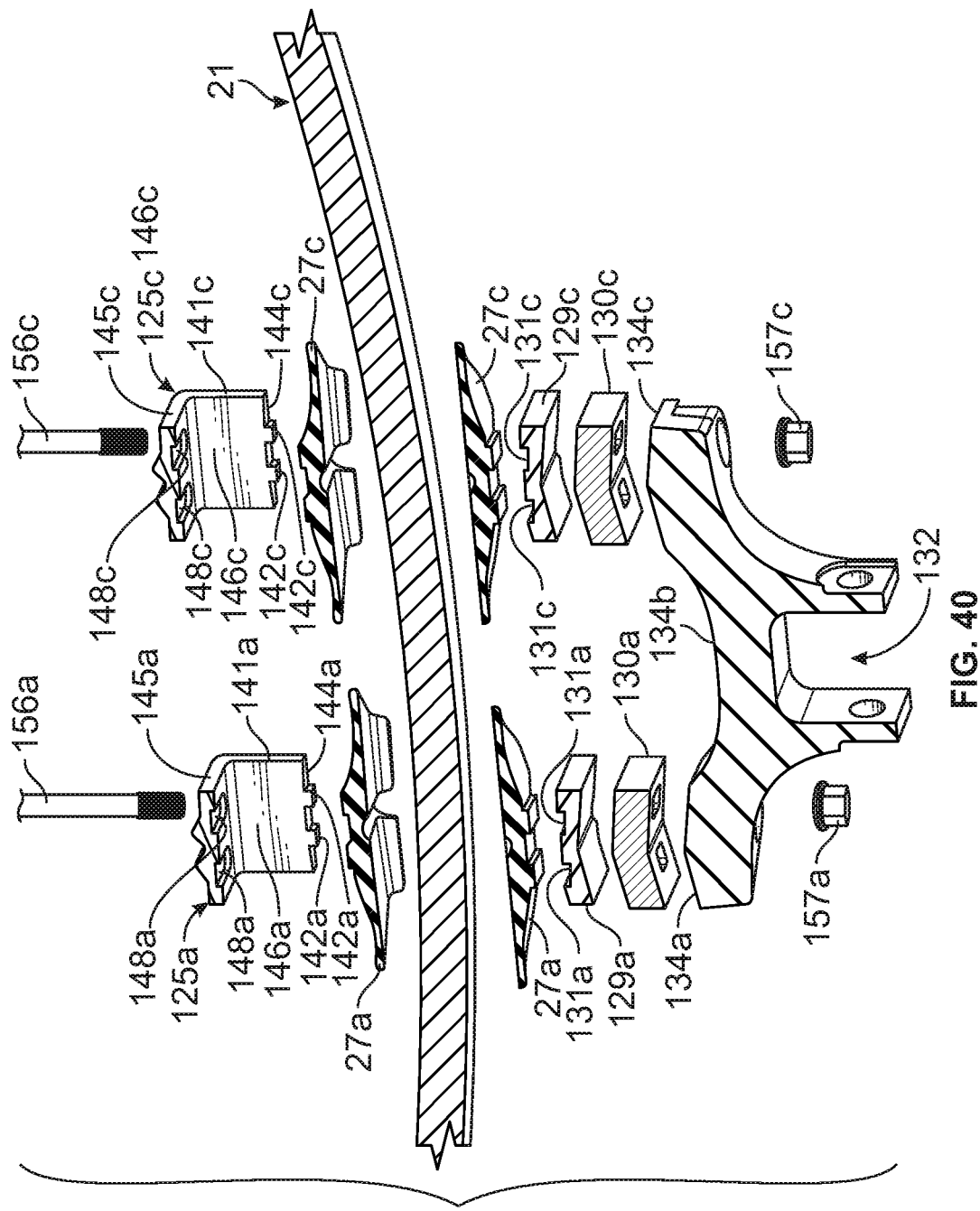
FIG. 40 is an exploded, left side, lower sectional view of the embodiment shown n FIGS. 34-35 and 37-39.
Figure 41:
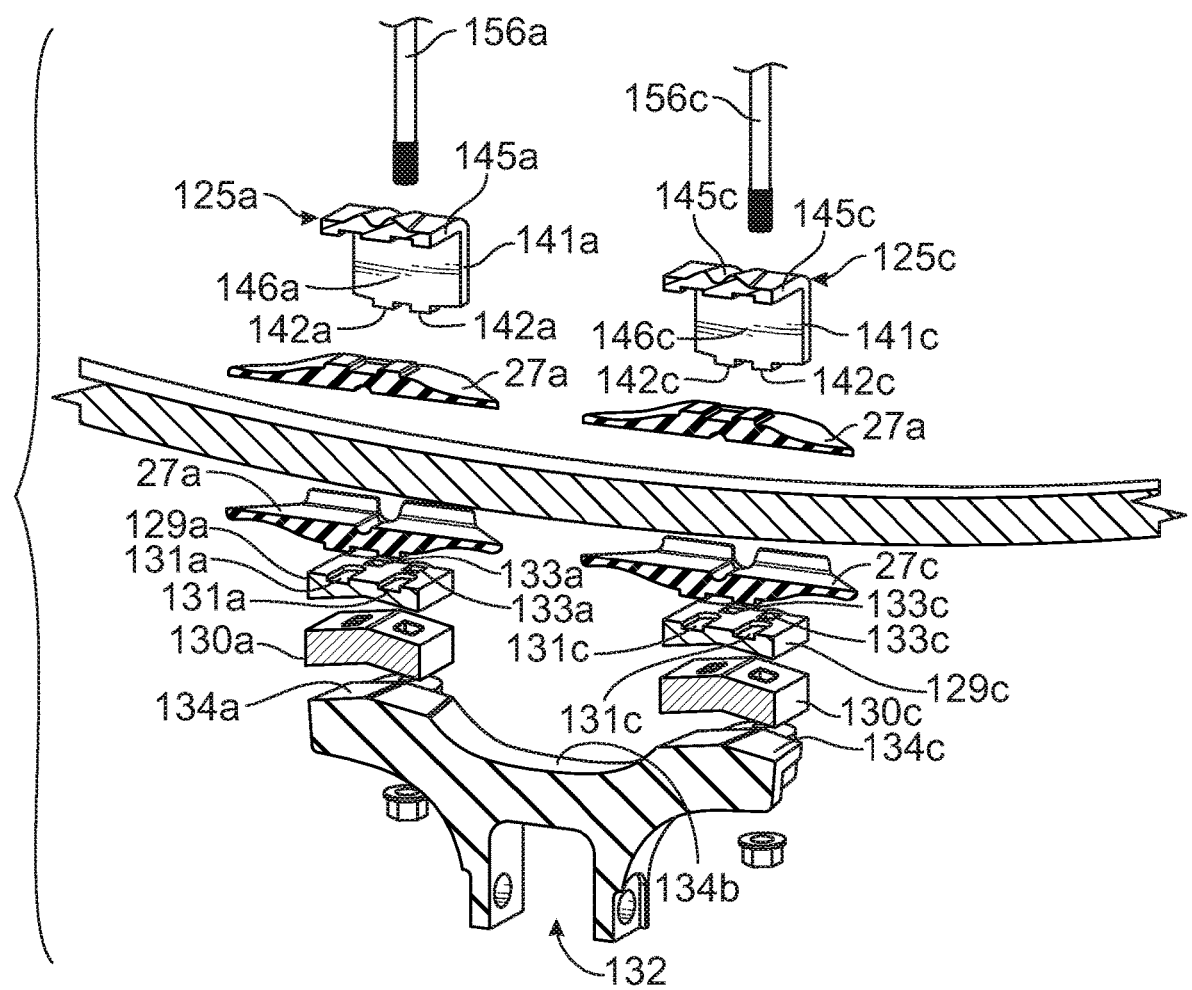
FIG. 41 is an exploded, left side, upper sectional view of the embodiment shown in FIG. 40

The first and second top mounting pads 125a,125c each include a top wall 145a,145c and downwardly extending first and second flanges 141a,141c and fit over, respectively, first and second seat sections 21a,21c of the leaf spring 21 (FIGS. 35,38). The underside of the top wall of each top mounting pad 125a,125c and the top surface of the corresponding support plate 129a,129c define a pair of laterally disposed, elongated grooves 148a,148c,131a,131c that receive the laterally disposed, elongated projections 55 of an elastomeric pad 27a,27c,28a,28c.

The first and second support plates 129a,129c are positioned below and on the opposite side of the leaf spring 21 from the first and second top mounting pads 125a, 125c. Projections or teeth (142a,142c in FIGS. 36,37) extending further in the downward direction from the distal end surfaces 144a,144c of the first and second flanges 141a,141c of each top mounting pad 125a,125c are received within corresponding apertures (133a,133c in FIG. 37) in the top surface inside of the lateral edges of a corresponding support plate 129a,129c, thereby preventing the top mounting pad 125a,125c and support plate 129a,129c from moving relative to one another in a horizontal plane and ensuring proper, predetermined alignment of these structures and their associated elastomeric pads. Generally vertical, interior surfaces of the downwardly extending flanges (129a,129c in FIG. 37) of the first and second top mounting pads 125a,125c are arcuately shaped and taper inward, forming opposing vertical wedges (146a,146c in FIG. 36) that extend above, adjacent to and below the leaf spring 21 in a direction perpendicular to the leaf spring.

The bottom inverted V shaped surface of each support plate 129a,129c engages the top wedge shape surface of a spacer plate 130a,130c, the bottom surface of which has an inverted V shape and engages the wedged shaped, top surface of the bottom mounting pad 134a,134c. The spacer plate 130a,130c in this embodiment is optional and contains hollow passages to reduce vehicle suspension weight. When used, spacer plates may be variously sized and configured to raise or lower vehicle ride height and may also vary in height between one another to create desired caster or opinion angle. (Desired caster or pinion angle may also be achieved with or without spacer plates by varying the elevation of one bottom mounting pad relative to the other). The complementary inverted V shaped and wedge shaped surfaces of these adjacent elements are laterally disposed thereby restricting their relative movement along the longitudinal axis of the leaf spring. It will be appreciated that the alternative structures and methods can be used to similarly restrict the relative movement of these elements without departing from the present disclosure. For example, a generally vertically oriented pin or stud could be positioned in the aligned bores of adjacent elements. As another example, adjacent elements could employ corresponding projections and recesses across their engagement surfaces.

Elastomeric pads 27a,27c,28a,28c made of a high durometer rubber or other suitable elastomeric material are positioned above and below first and second seat sections 21a,21c of the leaf spring 21. When assembled, the laterally disposed, elongated projections 55 on the top wall 51 of elastomeric pad 27a,27c,28a,28c are received within corresponding laterally disposed, elongated groove pairs 148a, 138c; 131a,131c on the underside of the first and second top mounting pads 125a,125c and on the top surface of first and second support plates 129a,129c. The lateral taper in the opposing sidewalls 54 of the top and bottom elastomeric pads 27a,27c,28a,28c and in the seat sections 21a,21c of the leaf spring, and the opposing, vertical wedges (146a,146c in FIG. 36) on the interior downwardly extending flanges of the top mounting pads, are all in registration with one another and assist in forming a mechanical lock to longitudinally and laterally restrain the leaf spring 21 within the clamp assembly 126 during use.

The first and second fastener assemblies in the illustrated second embodiment are hardened U-shaped fasteners 156a, 156c and connectors 157a,157c. Each threaded U shaped fastener 156a,156c is received within a groove that traverses the outside surface of the top wall 145a,145c and downwardly extending flanges 141a,141c. The legs of the U-shaped fasteners 156a,156c further extend through vertically oriented, open channels on opposite sides of the support plate 129a,129c and ultimately through bores in the bottom mounting plate 134a,134c. The structures and methods by which the clamp assembly can be tightened can be varied without departing from the scope of the present disclosure. As one alternative, for example, the U-shaped fastener could be rotated one hundred and eight degrees from the orientation shown in FIG. 34 so that the bight portion of the U-shaped fastener is received within a groove on the opposite side of the mounting pad incorporated into the axle seat bracket. In such an arrangement, the legs of U-shaped fastener would ultimately pass through corresponding bosses positioned on the outside of the downwardly extending flanges of the other (top) mounting pad. When tightened, each U shaped fastener would clamp together the associated top mounting pad, top elastomeric pad, leaf spring section, bottom elastomeric pad, support plate, spacer and bottom mounting pad. It will be appreciated that in the second illustrated embodiment, the first and second clamp groups have no rigid or fixed connection to one another above the leaf spring. In an underslung version of this second embodiment, there is no rigid or fixed connection between the first and second clamp groups below the leaf spring.

Those skilled in the art will appreciate that front axles in motor vehicle experience inter-axle load transfer during braking which increases the vertical load on the front axle. In fact, it is common for the front axle of a heavy duty or commercial vehicle to experience twice its normal vertical load (typically stated as 2G vertical load) as a result of this weight transfer during braking. In addition, when the front axle suspension is of the leaf-spring style, all of the additional vertical load in braking has the potential to generate a large torque that must be reacted from the axle through the leaf spring to the vehicle chassis. With an axle rated for 12,000 lbs. or higher, which is typical of heavy duty or commercial vehicles, the reacted vertical load for one spring at 2G (taking out unsprung mass) would be 10,800 lbs and the brake torque may be ≥200,000 in.lbs. The shear stress in the spring is directly related to the shear force and the cross-sectional area of the leaf spring. Assuming constant cross-sectional area of the spring, the peak shear stress will be directly related to the peak shear force. The shear force from the vertical load will be the same whether the spring has a single clamp or a spread active clamp group. The shear force due to brake torque, however is directly related to the moment arm length over which it reacts. In this case, that moment arm is the length of the clamp group. If a clamp group length is increased, the resulting shear force will be reduced.

Figure 42:
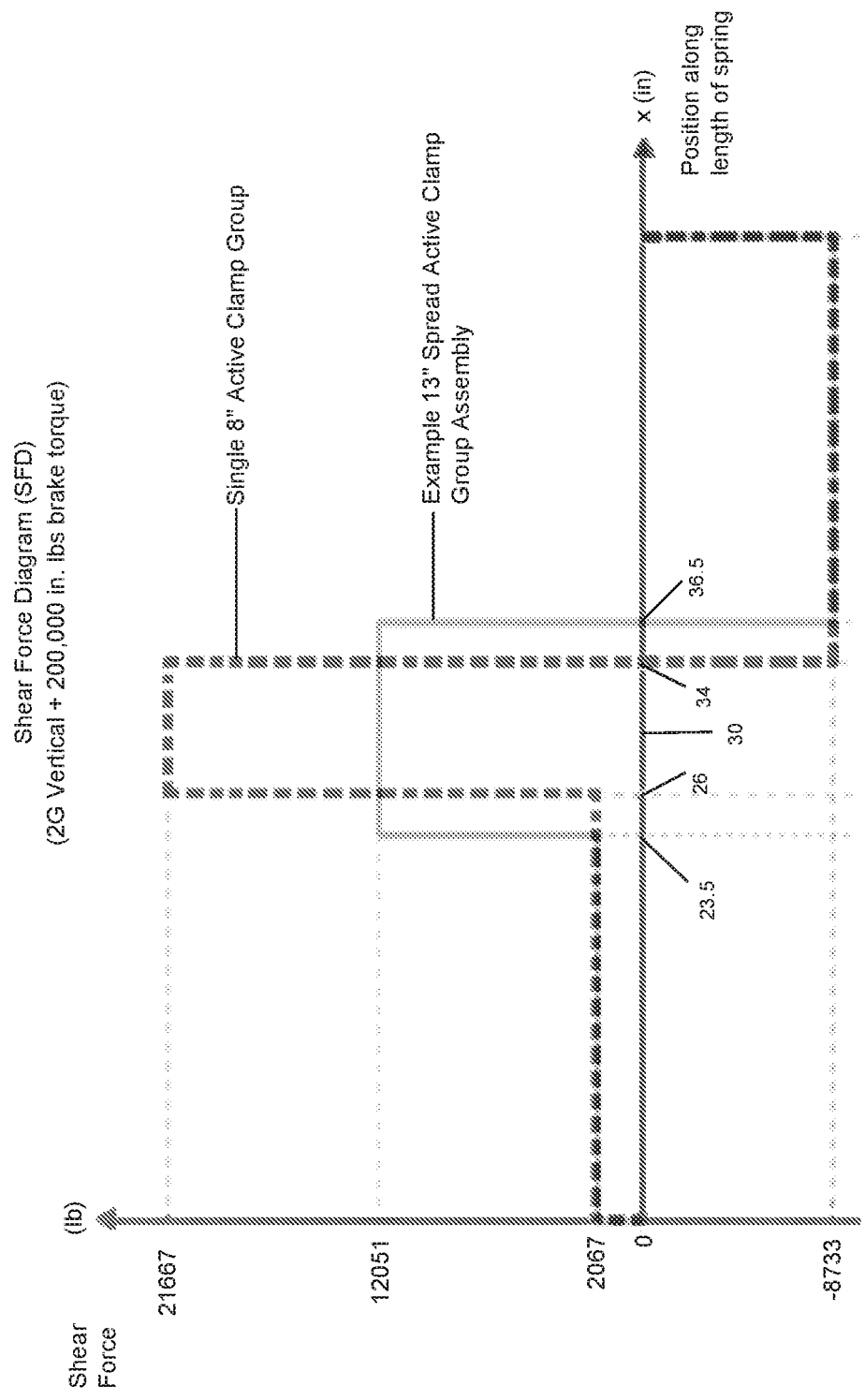
FIG. 42 is a diagram that compares the respective shear force experienced by the same composite leaf spring in an example 13" spread active clamp design of the present disclosure versus a single 8" active clamp design when each is incorporated into the front steering suspension of a heavy duty or commercial vehicle.

Applying the assumptions of the foregoing paragraph to a comparison of the peak shear force (and peak shear stress) when the same 60 inch, long, 4 inch wide, 1.5 inch thick composite spring is used in an example 13" spread active clamp assembly of the present disclosure versus an single 8" active clamp group design reveals that the former achieves a greater than forty percent (40%) reduction in peak shear force, and accordingly peak shear stress over the latter (see FIG. 42). The significance of this reduction cannot be overstated, as the example leaf spring in the former clamp assembly will not experience catastrophic failure over its expected lifecycle. In the latter clamp assembly, however, the example leaf spring will fail prematurely as the peak shear force and stress exceeds typical design specifications for this type of spring.

It will be appreciated that throughout this disclosure, with respect to the descriptions of all of the examples provided, terms such as upper, lower, top, bottom, left, right, front and rear, all are relative terms and are not intended to be limiting because they depend on the context in which they are used and the relative position of the device at the time. Accordingly, in the overslung configuration of the illustrated embodiments, the leaf spring is positioned above the axle, and the top mounting pads and top elastomeric pads are positioned above the leaf spring. The bottom elastomeric pads and bottom mounting pads, which are incorporated into the axle seat bracket which receives the axle, are positioned below the leaf spring and above the axle. In an underslung configuration, the leaf spring is positioned below the axle, and the first and second bottom mounting pads and first and second bottom elastomeric pads are positioned below the leaf spring. Positioned between the leaf spring and axle are the first and second top elastomeric pads and the first and second top mounting pads, which are incorporated into the axle bracket which receives the axle.

It will be understood that the embodiments described above are illustrative of some of the applications of the principles of the present subject matter. Numerous modifications may be made by those skilled in the art without departing from the spirit and scope of the claimed subject matter, including combinations of features that are individually disclosed or claimed herein. For these reasons, the scope of this disclosure is not limited to the above description but is as set forth in the following claims, and it is understood that claims may be directed to the features hereof, including as combinations of features that are individually disclosed or claimed herein.

We claim:

1. A suspension system for a vehicle axle comprising:
a leaf spring, the leaf spring extending in parallel with the longitudinal axis of a vehicle and having a first seat portion and a second seat portion which are separated from one another along the longitudinal axis of the leaf spring,
a clamp assembly, the clamp assembly comprising a first clamp group associated with the first seat portion and a second clamp group associated with the second seat portion, each of the first and second clamp groups further comprising a fastener assembly, a top mounting pad and a bottom mounting pad, the top mounting pad and the bottom mounting pad opposing one another and positioned in vertical alignment with and on opposite sides of the leaf spring, a top elastomeric pad and a bottom elastomeric pad, the top and bottom elastomeric pads positioned, respectively, between the top mounting pad and the leaf spring and the bottom mounting pad and the leaf spring;
wherein the bottom mounting pads or the top mounting pads of the first and second clamp groups are part of an axle seat bracket, the axle seat bracket configured to receive a laterally disposed vehicle axle;
wherein the first and second clamp groups either have no rigid or fixed connection to one another above the leaf spring or have no rigid or fixed connection to one another below the leaf spring;
wherein when the fastener assembly of each clamp group is tightened, the associated top mounting pad, top elastomeric pad, leaf spring, bottom elastomeric pad and bottom mounting pad are coupled together, and the section of the leaf spring between the first and second clamp groups remains unclamped and exhibits positive vertical displacement without contacting any rigid component of the clamp assembly.

2. The suspension system of claim 1 wherein the first and second clamp groups are separated along the longitudinal axis of the leaf spring by a distance greater than the width of the axle, or are positioned asymmetrically along the length of the leaf spring or with respect to the axle.

3. The suspension system of claim 1 having a distance between the center of the first clamp group to the center of the second clamp group and wherein the distance is at least 10 inches or at least 15 percent of the length of the leaf spring.

4. The suspension system of claim 1 wherein the distance is between 13 and 14 inches or between 21 and 24 percent of the length of the leaf spring.

5. The suspension system of claim 1 wherein the first and second clamp groups are positioned respectively fore and aft of the axle.

6. The suspension system of claim 1 wherein the first and second clamp groups are positioned the same distance from the axle.

7. The suspension system of claim 1 wherein the first and second clamp group are positioned symmetrically along the length of the leaf spring.

8. The suspension system of claim 1 wherein the length of each one of the first and second clamp groups with respect to the longitudinal axis of the leaf spring is three to four inches.

9. The suspension system of claim 1 wherein the leaf spring is a composite leaf spring, or is a composite leaf spring that is non-parabolic or that has a generally constant cross section along the length thereof.

10. The suspension system of claim 1 wherein the bottom mounting pad of one of the first and second clamp groups is disposed at a higher elevation relative to the other one of the bottom mounting pads of the first and second clamp groups.

11. The suspension system of claim 1 wherein the clamp assembly incorporates a mounting provision for a shock absorber or an air spring.

12. The suspension system of claim 1 wherein at least one of the top or bottom elastomeric pad of the first clamp group is mold bonded to a support plate, the support plate is removably secured to one of the top or the bottom mounting pads with at least one fastener.

13. The suspension system of claim 1 wherein at least one elastomeric pad of each of the first and second clamp groups defines a lateral groove extending across the width thereof and is positioned at the corresponding seat portion associated with the clamp group.

14. The suspension system of claim 1 wherein the leaf spring is configured to exhibit four point bending wherein a portion of the leaf spring between the first and second clamp groups exhibits uniform shear stress and uniform bending stress under vertical load.

15. The suspension system of claim 1 wherein the bottom mounting pads of the first and second clamp groups or the top mounting pads of the first and second clamp groups do not fall within the same plane.

16. The suspension system of claim 1 wherein one or both of the top mounting pads or the bottom mounting pads are joined by a surface that is concave in the direction of the leaf spring.

17. The suspension system of claim 1 wherein the first and second clamp groups are rigidly or fixedly connected to one another on only one side of, and either above or below, the leaf spring.

18. The suspension system of claim 1 wherein the top mounting pads of the first and second clamp groups or the bottom mounting pads of the first and second clamp groups are separate and discrete or not integrally formed with one another.

19. The suspension system of claim 1 wherein the top elastomeric pads of the first and second clamp groups or the bottom elastomeric pads of the first and second clamp groups are separate and discrete formations or are not integrally formed.

20. A suspension system for a vehicle axle comprising:
a leaf spring, the leaf spring extending in parallel with the longitudinal axis of a vehicle and having a first seat portion and a second seat portion which are separated from one another along the longitudinal axis of the leaf spring,
a clamp assembly, the clamp assembly comprising a first clamp group associated with the first seat portion and a second clamp group associated with the second seat portion, each of the first and second clamp groups further comprising a fastener assembly, a top mounting pad and a bottom mounting pad, the top mounting pad and the bottom mounting pad opposing one another and positioned in vertical alignment with and on opposite sides of the leaf spring, a top elastomeric pad and a bottom elastomeric pad, the top and bottom elastomeric pads positioned, respectively, between the top mounting pad and the leaf spring and the bottom mounting pad and the leaf spring;
wherein the bottom mounting pads or the top mounting pads of the first and second clamp groups are part of an axle seat bracket, the axle seat bracket configured to receive a laterally disposed vehicle axle;
wherein when the fastener assembly of each clamp group is tightened, the associated top mounting pad, top elastomeric pad, leaf spring, bottom elastomeric pad and bottom mounting pad are coupled together, and the section of the leaf spring between the first and second clamp groups remains unclamped and exhibits positive vertical displacement without contacting any rigid component of the clamp assembly; and
wherein the clamp assembly incorporates a mounting provision for a shock absorber or an air spring.

21. The suspension system of claim 20 wherein the claim assembly incorporates the mounting provision for the air spring and the air spring is configured to assist in adjusting the ride height of the vehicle.

22. The suspension system of claim 20 wherein at least one of the top or bottom elastomeric pad of the first clamp group is mold bonded to a support plate, the support plate is removably secured to one of the top or the bottom mounting pads with at least one fastener.

23. The suspension system of claim 20 wherein at least one elastomeric pad of each of the first and second clamp groups defines a lateral groove extending across the width thereof and is positioned at the corresponding seat portion associated with the clamp group.

24. The suspension system of claim 20 wherein the leaf spring is configured to exhibit four point bending wherein a portion of the leaf spring between the first and second clamp groups exhibits uniform shear stress and uniform bending stress under vertical load.

* * * * *